(12) United States Patent
Pegg

(10) Patent No.: US 8,606,340 B2
(45) Date of Patent: Dec. 10, 2013

(54) MULTI-DISPLAY MOBILE DEVICE

(75) Inventor: Albert Murray Pegg, Cambridge (CA)

(73) Assignee: BlackBerry Limited, Waterloo, Ontario (CA)

( * ) Notice: Subject to any disclaimer, the term of this patent is extended or adjusted under 35 U.S.C. 154(b) by 468 days.

(21) Appl. No.: 12/951,615

(22) Filed: Nov. 22, 2010

(65) Prior Publication Data
US 2012/0127061 A1    May 24, 2012

(51) Int. Cl.
*H04M 1/00* (2006.01)
(52) U.S. Cl.
USPC ....................................................... 455/575.4
(58) Field of Classification Search
USPC ............ 345/173, 204, 168, 76, 1.1, 156, 169, 345/172; 455/575.3, 566.1, 575.4, 575.1, 455/550.1, 575.2, 90.3, 560, 351; 361/679.27, 679.15, 679.04, 679.55, 361/679.3, 727, 679.09, 679.26, 679.01, 361/680, 679.21
See application file for complete search history.

(56) References Cited

U.S. PATENT DOCUMENTS

| | | | |
|---|---|---|---|
| 5,200,913 A | 4/1993 | Hawkins et al. | |
| 5,857,157 A | 1/1999 | Shindo | |
| 6,381,128 B1 | 4/2002 | Kramer | |
| 6,384,811 B1 | 5/2002 | Kung et al. | |
| 6,539,208 B1 | 3/2003 | Mori | |
| 6,630,925 B1 | 10/2003 | Östergärd et al. | |
| 6,636,419 B2 | 10/2003 | Duarte | |
| 6,643,124 B1 | 11/2003 | Wilk | |
| 6,798,649 B1 | 9/2004 | Olodort et al. | |
| 6,836,404 B2 | 12/2004 | Duarte | |
| 6,842,627 B2 | 1/2005 | Harsu et al. | |
| 6,892,082 B2 | 5/2005 | Boesen | |
| 7,006,015 B2 | 2/2006 | England | |
| 7,107,084 B2 | 9/2006 | Duarte et al. | |
| 7,158,634 B2 | 1/2007 | Eromaki | |

(Continued)

FOREIGN PATENT DOCUMENTS

| | | |
|---|---|---|
| CA | 2756483 | 5/2012 |
| EP | 1217501 | 6/2002 |

(Continued)

OTHER PUBLICATIONS

Extended European Search Report. European Application No. 10192017.1. Dated: Jun. 6, 2011.

(Continued)

*Primary Examiner* — Melody Mehrpour
(74) *Attorney, Agent, or Firm* — Bereskin & Parr LLP/S.E.N.C.R.L., s.r.l.

(57) ABSTRACT

A mobile device comprising a first portion and a second portion is provided. In at least one embodiment, the first portion comprises a first part providing at least a first display screen, and a second part providing at least a second display screen. The first part may be foldably coupled to the second part to allow the first part to fold with respect to the second part about a first folding axis. The second portion comprises a third part providing at least a third display screen. The first portion is slidably coupled to the second portion, and at least one of the first portion and the second portion comprises one or more coupling elements configured so that the second part of the first portion is foldable with respect to the third part of the second portion about a second folding axis. In one embodiment, the first, second and third parts are folded to resemble a picture frame comprising multiple digital displays.

22 Claims, 22 Drawing Sheets

(56) References Cited

U.S. PATENT DOCUMENTS

| | | | |
|---|---|---|---|
| 7,199,313 B1* | 4/2007 | Kemppinen | 200/5 A |
| 7,225,002 B2 | 5/2007 | Lee et al. | |
| 7,355,843 B2 | 4/2008 | Riddiford | |
| 7,363,066 B2 | 4/2008 | Im et al. | |
| 7,375,952 B2 | 5/2008 | Tsai | |
| 7,376,449 B2 | 5/2008 | Mizuta et al. | |
| 7,398,114 B2 | 7/2008 | Gartrell | |
| 7,469,156 B2 | 12/2008 | Kota et al. | |
| 7,508,411 B2 | 3/2009 | Boesen | |
| 7,522,945 B2 | 4/2009 | Kilpi et al. | |
| 7,599,487 B2 | 10/2009 | Lim | |
| 7,616,974 B2 | 11/2009 | Jaakkola | |
| 7,620,425 B2 | 11/2009 | Ju | |
| 7,690,576 B2 | 4/2010 | Ladouceur et al. | |
| 7,831,286 B2 | 11/2010 | Cho et al. | |
| 7,986,985 B2* | 7/2011 | Niitsu et al. | 455/575.4 |
| 8,098,231 B2 | 1/2012 | Jacobs et al. | |
| 8,223,477 B2 | 7/2012 | Shi et al. | |
| 8,249,676 B2 | 8/2012 | Ladouceur et al. | |
| 8,254,116 B2* | 8/2012 | Wu et al. | 361/679.56 |
| 8,346,322 B2* | 1/2013 | Yoon | 455/575.4 |
| 8,503,174 B2 | 8/2013 | Fyke | |
| 2002/0077161 A1 | 6/2002 | Eromaki | |
| 2004/0157653 A1 | 8/2004 | Kato | |
| 2004/0160511 A1* | 8/2004 | Boesen | 348/14.02 |
| 2004/0185920 A1* | 9/2004 | Choi et al. | 455/575.1 |
| 2004/0185921 A1* | 9/2004 | Tornaghi | 455/575.1 |
| 2004/0204126 A1 | 10/2004 | Reyes et al. | |
| 2004/0224730 A1* | 11/2004 | Sakai et al. | 455/575.3 |
| 2004/0224732 A1* | 11/2004 | Lee et al. | 455/575.3 |
| 2005/0009581 A1 | 1/2005 | Im et al. | |
| 2005/0026652 A1* | 2/2005 | Kawamura | 455/556.1 |
| 2005/0054395 A1* | 3/2005 | Arbisi et al. | 455/575.3 |
| 2005/0064919 A1* | 3/2005 | An et al. | 455/575.3 |
| 2005/0079900 A1* | 4/2005 | Li | 455/575.3 |
| 2005/0085273 A1* | 4/2005 | Khalid et al. | 455/566 |
| 2005/0090296 A1* | 4/2005 | Gordecki | 455/575.3 |
| 2005/0096082 A1* | 5/2005 | Chang | 455/550.1 |
| 2005/0096106 A1* | 5/2005 | Bennetts et al. | 455/575.3 |
| 2005/0130702 A1* | 6/2005 | Saburi et al. | 455/556.1 |
| 2005/0130718 A1* | 6/2005 | Woo | 455/575.3 |
| 2005/0136970 A1* | 6/2005 | Kim | 455/550.1 |
| 2005/0136999 A1* | 6/2005 | Jeon | 455/575.3 |
| 2005/0159189 A1* | 7/2005 | Iyer | 455/566 |
| 2005/0176434 A1 | 8/2005 | White, Jr. | |
| 2005/0192066 A1* | 9/2005 | Park et al. | 455/575.3 |
| 2005/0227737 A1* | 10/2005 | Moon et al. | 455/566 |
| 2005/0266900 A1* | 12/2005 | Zou | 455/575.3 |
| 2005/0288072 A1* | 12/2005 | Kemppinen | 455/575.3 |
| 2006/0019714 A1* | 1/2006 | Lee et al. | 455/566 |
| 2006/0019728 A1* | 1/2006 | Sakamoto et al. | 455/575.3 |
| 2006/0030380 A1* | 2/2006 | Pentinpuro | 455/575.3 |
| 2006/0094482 A1* | 5/2006 | Takagi | 455/575.3 |
| 2006/0135225 A1* | 6/2006 | Lin et al. | 455/575.3 |
| 2006/0183505 A1 | 8/2006 | Willrich | |
| 2006/0229117 A1* | 10/2006 | Lehtonen | 455/575.3 |
| 2006/0252471 A1 | 11/2006 | Pan | |
| 2007/0004475 A1* | 1/2007 | Kuo et al. | 455/575.3 |
| 2007/0091582 A1 | 4/2007 | Ku et al. | |
| 2007/0142101 A1 | 6/2007 | Seshagiri et al. | |
| 2007/0146977 A1 | 6/2007 | Choi | |
| 2007/0153465 A1 | 7/2007 | Shih et al. | |
| 2007/0191070 A1 | 8/2007 | Rao | |
| 2008/0032637 A1 | 2/2008 | Ladouceur et al. | |
| 2008/0058034 A1 | 3/2008 | Lu et al. | |
| 2008/0064452 A1* | 3/2008 | Kim et al. | 455/575.3 |
| 2008/0070644 A1* | 3/2008 | Park et al. | 455/575.3 |
| 2008/0081505 A1 | 4/2008 | Ou et al. | |
| 2008/0117573 A1 | 5/2008 | Im et al. | |
| 2008/0125198 A1* | 5/2008 | Kim | 455/575.3 |
| 2008/0139261 A1 | 6/2008 | Cho et al. | |
| 2008/0174942 A1 | 7/2008 | Yang et al. | |
| 2008/0254843 A1* | 10/2008 | Maenpaa | 455/575.3 |
| 2008/0261666 A1 | 10/2008 | Niitsu et al. | |
| 2009/0009949 A1 | 1/2009 | Lai et al. | |
| 2009/0015996 A1 | 1/2009 | Chang et al. | |
| 2009/0061956 A1 | 3/2009 | Matsuoka | |
| 2009/0104932 A1* | 4/2009 | Chiang | 455/556.1 |
| 2009/0117955 A1* | 5/2009 | Lo | 455/575.3 |
| 2009/0137274 A1* | 5/2009 | Kim et al. | 455/556.1 |
| 2009/0156263 A1* | 6/2009 | Park et al. | 455/566 |
| 2009/0168339 A1 | 7/2009 | Lee | |
| 2009/0239594 A1 | 9/2009 | Huang et al. | |
| 2009/0259969 A1 | 10/2009 | Pallakoff | |
| 2010/0004037 A1* | 1/2010 | Ozawa | 455/575.3 |
| 2010/0007576 A1 | 1/2010 | Demuynck et al. | |
| 2010/0016038 A1* | 1/2010 | Demuynck et al. | 455/575.3 |
| 2010/0035669 A1 | 2/2010 | Jang et al. | |
| 2010/0039350 A1 | 2/2010 | Wakefield et al. | |
| 2010/0039372 A1 | 2/2010 | Futter | |
| 2010/0041439 A1* | 2/2010 | Bullister | 455/566 |
| 2010/0064244 A1 | 3/2010 | Kilpatrick, II et al. | |
| 2010/0103054 A1 | 4/2010 | Shi et al. | |
| 2010/0117629 A1* | 5/2010 | Lombardi et al. | 324/207.2 |
| 2010/0120479 A1 | 5/2010 | Ogatsu | |
| 2010/0124955 A1 | 5/2010 | Lin | |
| 2010/0160010 A1 | 6/2010 | Ladouceur et al. | |
| 2010/0184492 A1 | 7/2010 | Kim et al. | |
| 2010/0222111 A1* | 9/2010 | Suetake | 455/566 |
| 2010/0304793 A1 | 12/2010 | Kim et al. | |
| 2011/0104189 A1* | 5/2011 | Suarez et al. | 424/184.1 |
| 2011/0105189 A1* | 5/2011 | Lee et al. | 455/566 |
| 2011/0159934 A1 | 6/2011 | Yu et al. | |
| 2011/0177850 A1* | 7/2011 | Griffin et al. | 455/575.3 |
| 2011/0216485 A1 | 9/2011 | Kang et al. | |
| 2011/0241998 A1* | 10/2011 | McKinney et al. | 345/168 |
| 2011/0263304 A1* | 10/2011 | Laido et al. | 455/575.3 |
| 2012/0200990 A1 | 8/2012 | Fyke | |
| 2012/0280914 A1 | 11/2012 | Ladouceur et al. | |

FOREIGN PATENT DOCUMENTS

| | | |
|---|---|---|
| EP | 1542435 | 6/2005 |
| EP | 1548544 | 6/2005 |
| EP | 1585316 | 10/2005 |
| EP | 1 881 680 | 1/2008 |
| EP | 2469804 | 9/2012 |
| GB | 2347577 | 9/2000 |
| WO | 03021408 | 3/2003 |
| WO | 03/103261 | 12/2003 |
| WO | 2004054210 | 6/2004 |
| WO | 2006/088809 | 8/2006 |
| WO | 2007012235 | 2/2007 |
| WO | 2009013690 | 1/2009 |
| WO | 2009/151651 | 12/2009 |
| WO | 2010/008417 | 1/2010 |
| WO | 2010/019293 | 2/2010 |

OTHER PUBLICATIONS

Co-pending U.S. Appl. No. 13/020,955. "Magnetic Slider Mechanism for Electronic Devices and Methods of Use", filed Feb. 4, 2011.

"The Concept MID from Peter Cubika—winner of Intel" Retrieved from Internet [May 25, 2010]: http://www.phonemodels.net/?s=The +concept+MID+from+Peter+Cubika.

Co-pending U.S. Appl. No. 12/717,040, "Handheld Mobile Communication Device with Moveable Display/Cover Member", filed Mar. 3, 2010.

Tat, "The Astonishing Tribe Demonstrates Mobile Phone Multiple Screen Display on TI's OMAP™ 4 Platform at Mobile World Congress: Mobile phone Display Expands Far Beyond the Single Small Device Screen", Feb. 15, 2010. Retrieved from Internet [Nov. 19, 2010]: http://www.marketwire.com/mw/rel_us_print.jsp?id=1116874.

Davies, Chris, "Butterfly Concept Cellphone Design is Sign of Early Talent", Apr. 5, 2007. Retrieved from Internet [Nov. 22, 2010]: http://www.slashgear.com/butterfly-concept-cellphone-design-is-sign-of-early-talent-054654/.

Tech E Blog, "Prime Laptop Has Three Displays", Dec. 29, 2008. Retrieved from Internet [Nov. 22, 2010]: http://www.techeblog.com/index.php/tech-gadget/prime-laptop-has-three-displays.

(56) References Cited

OTHER PUBLICATIONS

Murtazin, Eldar, "Mobile Technologies and Communication", Jun. 2001. Retrieved from Internet [Nov. 22, 2010]: http://ixbtlabs.com/articles/digestmobile0106/.
Geeksugar, "Balance Cell Phone: Smartphone + Luxury", May 22, 2007. Retrieved from Internet [Nov. 22, 2010]: http://www.geeksugar.com/Balance-Cell-Phone-Smartphone-Luxury-267056.
Mobile, "Three Screen Concept Phone", Jan. 6, 2009. Retrieved from Internet [Nov. 22, 2010]: http://www.mobile-t-mobile.com/mobule-reviews/3-sensor-displays.html.
Kim Poh, Liaw, "Nalu Origami Mobile Communicator", Feb. 19, 2007. Retrieved from Internet [Nov. 22, 2010]: http://www.iphonebuzz.com/nalu-origami-mobile-communicator-19428.php.
Murph, Darren, "Japanese Concept Phone Sports Three Screens", Jul. 31, 2007. Retrieved from Internet [Nov. 22, 2010]: http://mobile.engadget.com/2007/07/31/japanese-concept-phone-sports-three-screens/.
Ha, Peter, KDDI au Triple LCD Concept Phone Makes you Say Wha?!, Aug. 7, 2007. Retrieved from Internet [Nov. 19, 2010]: http://www.crunchgearcom/2007/08/07/kddi-au-triple-lcd-concept-phone-makes-you-say-wha/.
Sorrel, Charlie, "KDDI Three Screen Concept Phone", Aug. 6, 2007. Retrieved from Internet [Nov. 22, 2010]: http://www.wired.com/gadgetlab/2007/08/kddi-three-scre/.
Evans, Mike, "Japanese Triple-Screen Concept Phones", Aug. 1, 2007. Retrieved from Internet [Nov. 22, 2010]: http://mobilementalism.com/2007/08/01/japanese-triple-screen-concept-phones/.
Response. European Application No. 10192017.1. Dated: Jun. 22, 2011.
Communication under Rule 71(3) EPC. European Application No. 10192017.1. Dated: Oct. 10, 2011.
Noting of Loss of Rights Pursuant to Rule 112(1) EPC. European Application No. 10192017.1. Dated: Mar. 28, 2012.
Request for Decision. European Application No. 10192017.1. Dated: Mar. 29, 2012.
European Patent Office Communication. European Application No. 10192017.1. Dated: Apr. 12, 2012.
Communication under Rule 71(3) EPC. European Application No. 10192017.1. Dated: Apr. 16, 2012.
Decision to grant a European patent pursuant to Article 97(1) EPC. European Application No. 10192017.1. Dated: Aug. 17, 2012.
Office Action. U.S. Appl. No. 13/020,955. Dated: Nov. 23, 2012.
Amendment. U.S. Appl. No. 13/020,955. Dated: Jan. 18, 2013.
Notice of Allowance. U.S. Appl. No. 13/020,955. Dated: May 2, 2013.
Prosecution Documents for U.S. Appl. No. 11/458,453, issued to Patent No. 7,690,576 on Apr. 6, 2010.
Prosecution Documents for U.S. Appl. No. 12/717,040, issued to Patent No. 8,249,676 on Aug. 21, 2012.
Preliminary Amendment. U.S. Appl. No. 13/550,768. Dated: Jul. 17, 2012.
Office Action. U.S. Appl. No. 13/550,768. Dated: Aug. 28, 2012.
Amendment. U.S. Appl. No. 13/550,768. Dated: Nov. 1, 2012.
Final Office Action. U.S. Appl. No. 13/550,768. Dated: Dec. 3, 2012.
Motorola RIZR Z8, http://www.mobilestopic.com/reviews/motorola/rizr-z8.html, MobilesTopic, May 19, 2008.
Notice of Abandonment. U.S. Appl. No. 13/550,768. Dated: Jul. 25, 2013.

\* cited by examiner

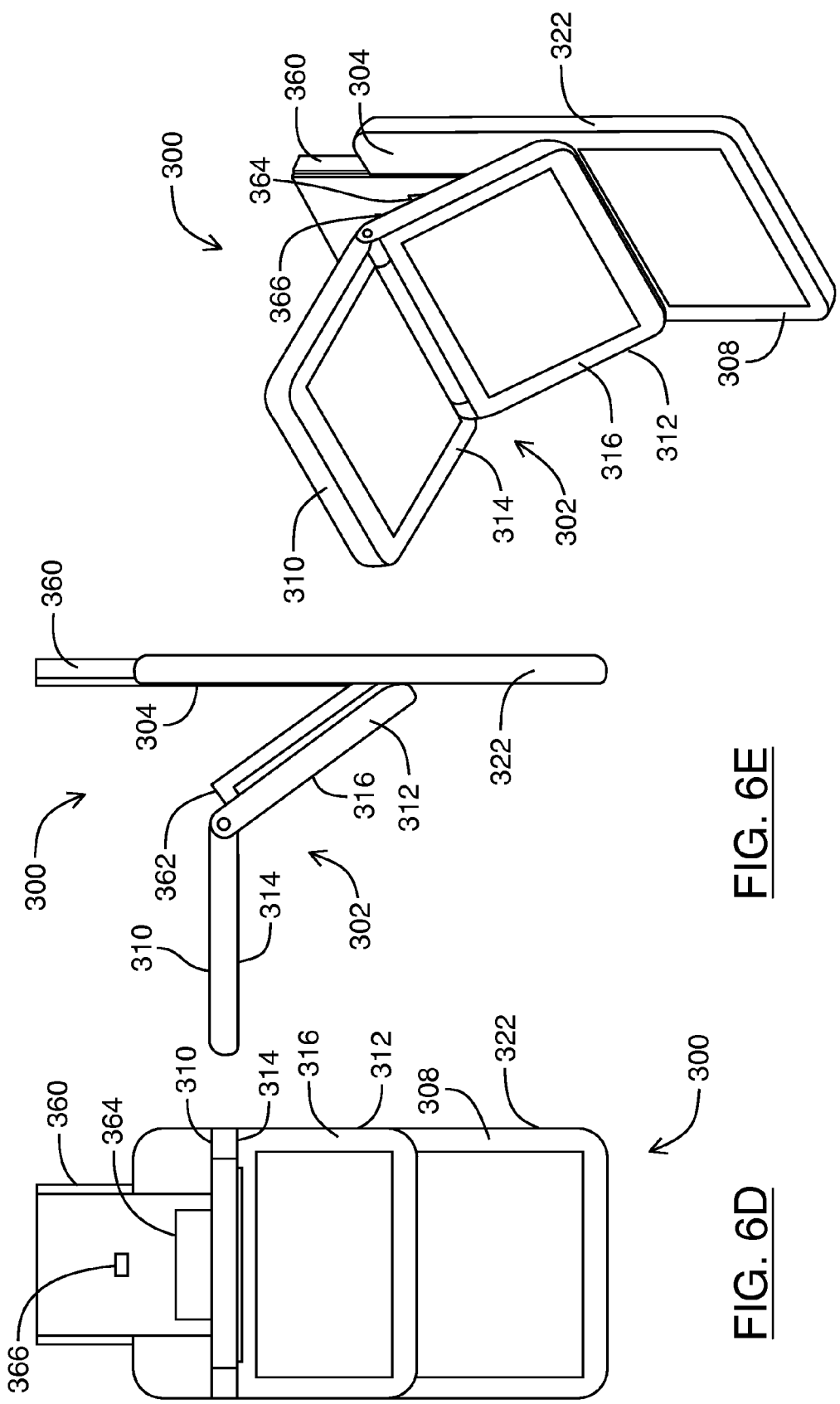

MULTI-DISPLAY MOBILE DEVICE

RELEVANT FIELD

Embodiments disclosed herein relate generally to mobile devices, and more particularly to mobile devices comprising a plurality of displays.

BACKGROUND

Some known mobile devices are provided with multiple displays. For example, some flip-style mobile devices may provide an exterior display and an interior display. The interior display is typically hidden when the mobile device is flipped closed.

BRIEF DESCRIPTION OF THE DRAWINGS

Embodiments are described in further detail below, by way of example only, with reference to the accompanying drawings, in which:

FIGS. 6D to 6F illustrate views of the mobile device of FIGS. 4A and 5A according to another example embodiment;

DETAILED DESCRIPTION

Some embodiments of the system and methods described herein make reference to a mobile device. A mobile device may be a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities), for example. A mobile device may communicate with other devices through a network of transceiver stations.

Figure 1:
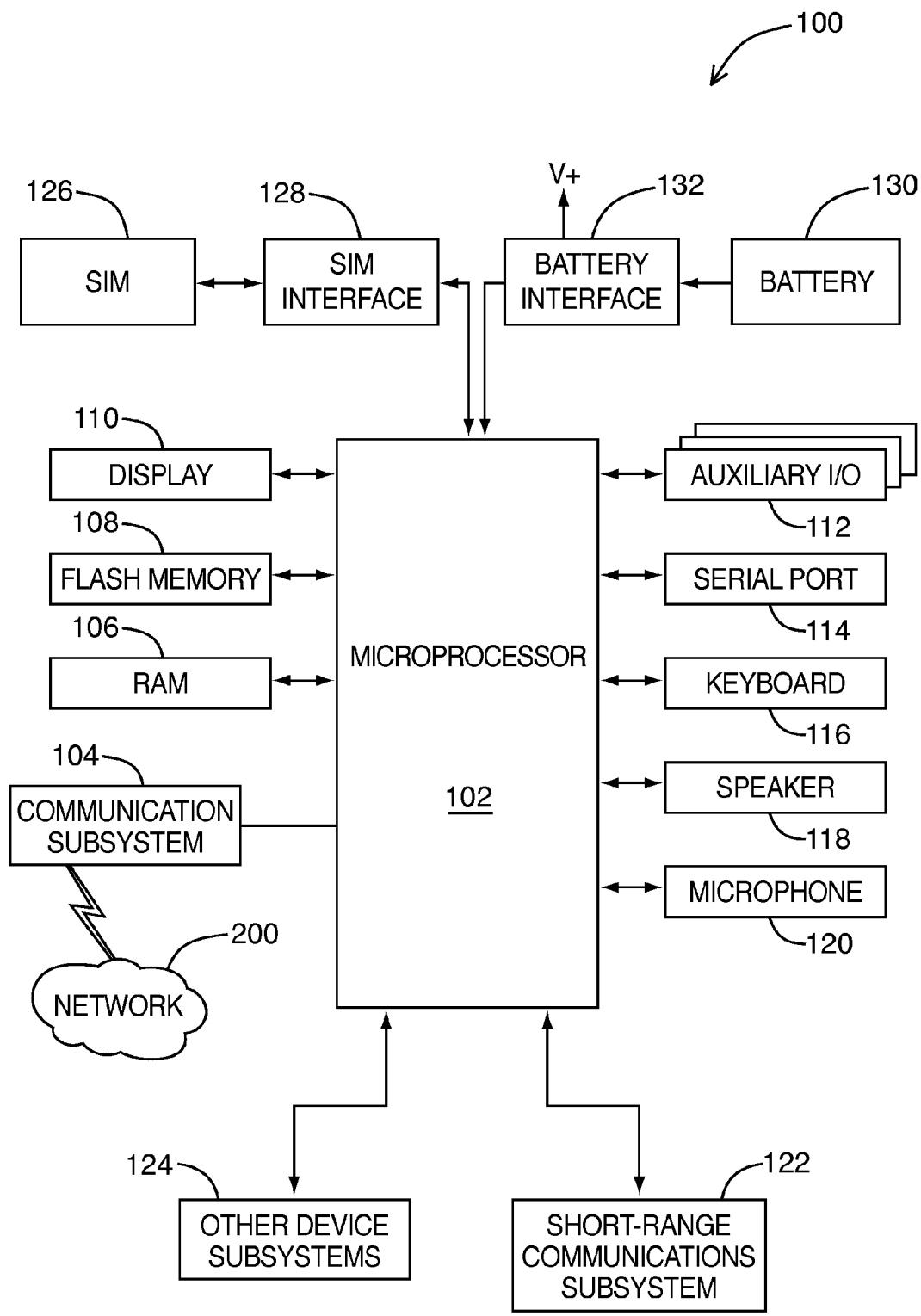
FIG. 1 is a block diagram of a mobile device in one example implementation.
Figure 2:
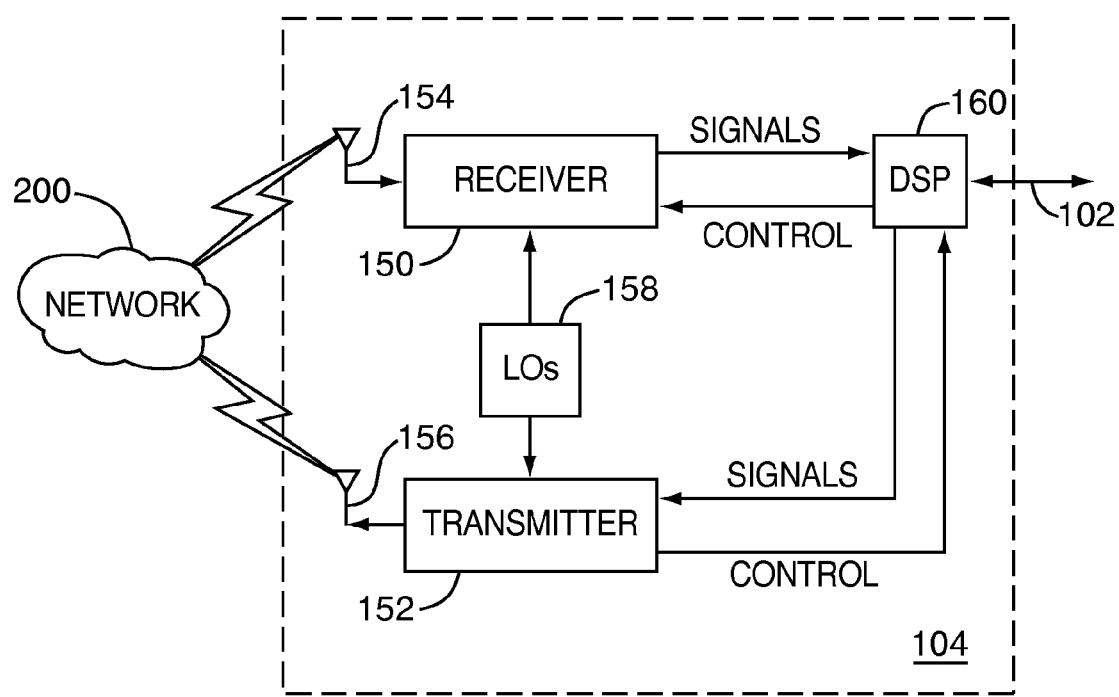
FIG. 2 is a block diagram of a communication subsystem component of the mobile device of FIG. 1.
Figure 3:
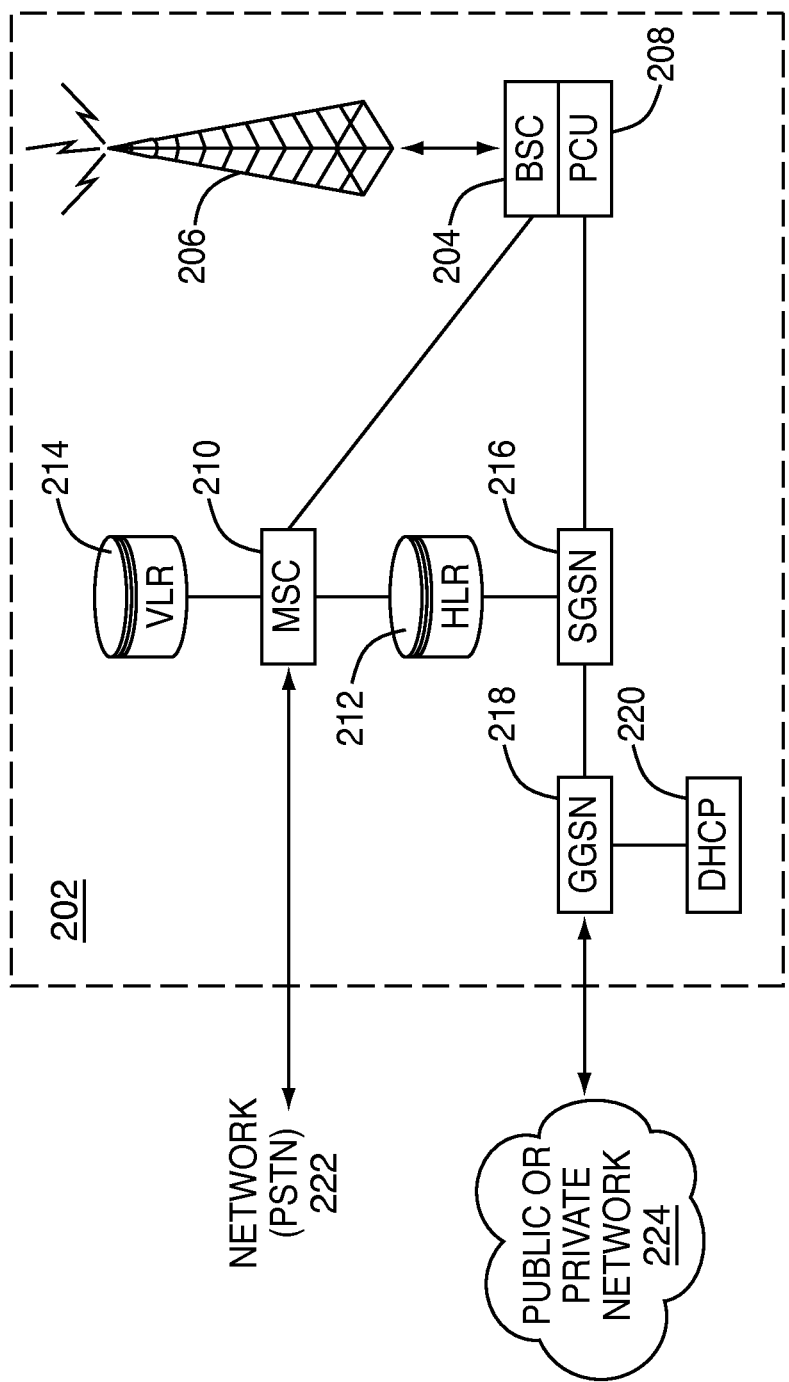
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, may be performed through communication subsystem 104. Communication subsystem 104 may be configured to receive messages from and send messages to a wireless network 200. In one example implementation of mobile device 100, communication subsystem 104 may be configured in accordance with the Global System for Mobile Communication (GSM) and General Packet Radio Services (GPRS) standards. The GSM/GPRS wireless network is used worldwide and it is expected that these standards may be supplemented or superseded eventually by Enhanced Data GSM Environment (EDGE) and Universal Mobile Telecommunications Service (UMTS), and Ultra Mobile Broadband (UMB), etc. New standards are still being defined, but it is believed that they will have similarities to the network behaviour described herein, and it will also be understood by persons skilled in the art that the embodiments of the present disclosure are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, datacentric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems. Other network communication technologies that may be employed include, for example, Integrated Digital Enhanced Network (iDEN™), Evolution-Data Optimized (EV-DO), and High Speed Packet Access (HSPA), etc.

Microprocessor 102 may also interact with additional subsystems such as a Random Access Memory (RAM) 106, flash memory 108, display 110, auxiliary input/output (I/O) subsystem 112, serial port 114, keyboard 116, speaker 118, microphone 120, short-range communications subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, as well as device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after network registration or activation procedures have been completed. Network access may be associated with a subscriber or user of a mobile device 100. To identify a subscriber, mobile device 100 may provide for a Subscriber Identity Module ("SIM") card 126 to be inserted in a SIM interface 128 in order to communicate with a network. SIM 126 may be one example type of a conventional "smart card" used to identify a subscriber of mobile device 100 and to personalize the mobile device 100, among other things. Without SIM 126, mobile device 100 may not be fully operational for communication with network 200. By inserting SIM 126 into SIM interface 128, a subscriber may access all subscribed services. Services may include, without limitation: web browsing and messaging such as e-mail, voice mail, Short Message Service (SMS), and Multimedia Messaging Services (MMS). More advanced services may include, without limitation: point of sale, field service and sales force automation. SIM 126 may include a processor and memory for storing information. Once SIM 126 is inserted in SIM interface 128, it may be coupled to microprocessor 102. In order to identify the subscriber, SIM 126 may contain some user parameters such as an International Mobile Subscriber Identity (IMSI). By using SIM 126, a subscriber may not necessarily be bound by any single physical mobile device. SIM 126 may store additional subscriber information for a mobile device as well, including datebook (or calendar) information and recent call information.

Mobile device 100 may be a battery-powered device and may comprise a battery interface 132 for receiving one or more rechargeable batteries 130. Battery interface 132 may be coupled to a regulator (not shown), which assists battery 130 in providing power V+ to mobile device 100. Although current technology makes use of a battery, future technologies such as micro fuel cells may provide power to mobile device 100. In some embodiments, mobile device 100 may be solar-powered.

Microprocessor 102, in addition to its operating system functions, enables execution of software applications on mobile device 100. A set of applications that control basic device operations, including data and voice communication applications, may be installed on mobile device 100 during its manufacture. Another application that may be loaded onto mobile device 100 is a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality may create a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication include standards developed by the Infrared Data Association (IrDA), Bluetooth®, and the 802.11 family of standards (Wi-Fi®) developed by IEEE.

In use, a received signal such as a text message, an e-mail message, or web page download is processed by communication subsystem 104 and input to microprocessor 102. Microprocessor 102 then processes the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, optical trackpad infrared fingerprint detector, or a roller wheel with dynamic button pressing capability. Keyboard 116 may comprise an alphanumeric keyboard and/or telephone-type keypad, for example. A composed item may be transmitted over network 200 through communication subsystem 104.

For voice communications, the overall operation of mobile device 100 may be substantially similar, except that the received signals may be processed and output to speaker 118, and signals for transmission may be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 may comprise a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate; thus, it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. ND conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is generally a limited resource, typically due to limits in overall bandwidth and limited battery power of mobile device 100.

When mobile device 100 is fully operational, transmitter 152 may be typically keyed or turned on only when it is sending to network 200 and may otherwise be turned off to conserve resources. Similarly, receiver 150 may be periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with GPRS and GSM technologies; however, in other embodiments, different standards may be implemented as discussed in more detail above. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) server 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 may be a fixed transceiver station. Station 206 and BSC 204 together may form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile may be stored in HLR 212. HLR 212 may also contain location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times while requiring less use of computing resources.

SGSN 216 and GGSN 218 are elements that may be added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSNs 216 via an Internet Protocol (IP) backbone network operated within the network 200. During normal operations, a given mobile device 100 performs a "GPRS Attach" to acquire an IP address and to access data services.

This normally is not present in circuit switched voice channels as Integrated Services Digital Network (ISDN) addresses may be generally used for routing incoming and outgoing calls. Currently, GPRS capable networks may use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server, for example. Once the GPRS Attach is complete, a logical connection is established from a mobile device 100, through PCU 208, and SGSN 216 to an Access Point Node (APN) within GGSN 218, for example. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot generally exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

In at least some embodiments described herein, there is provided a mobile device comprising a first portion slidably coupled to a second portion, wherein at least one part of the first potion is foldable with respect to at least one part of the second portion such that the mobile device resembles a picture frame comprising multiple digital displays.

In one broad aspect, there is provided a mobile device. The mobile device comprises a first portion and a second portion. The first portion comprises a first part providing at least a first display screen, and a second part providing at least a second display screen. The first part is foldably coupled to the second part to allow the first part to fold with respect to the second part about a first folding axis. The second portion comprises a third part providing at least a third display screen. The first portion is slidably coupled to the second portion and at least one of the first portion and the second portion comprises one or more coupling elements configured so that the second part of the first portion is foldable with respect to the third part of the second portion about a second folding axis.

In another broad aspect, at least two of (i) an edge of the first part, (ii) an edge of the second part, and (iii) an edge of the third part may lie in a same plane. At least one of the first folding axis and the second folding axis may be normal to the same plane. In some embodiments, all three of the edge of the first part, the edge of the second part and the edge of the third part may lie in the same plane.

In another broad aspect, the first portion may comprise a hinge that foldably couples the first part to the second part.

In another broad aspect, the one or more coupling elements may comprise a hinge that foldably couples the second part of the first portion to the third part of the second portion. In one embodiment, the second part may provide a contact surface configured to abut the third part and to stop the second part from folding about the second folding axis with respect to the third part, after a predetermined fold angle between the second part and the third part is obtained. The second part may provide a beveled edge, and the beveled edge may comprise the contact surface. In another embodiment, the second part may provide a contact surface configured to mate with an indent in the second portion and to stop the second part from folding about the second folding axis with respect to the third part, after a predetermined fold angle between the second part and the third part is obtained.

In another broad aspect, the first portion may be configured to slide relative to the second portion between at least a first position and a second position. When in the first position, the third display screen may be covered by the first portion, whereas in the second position, the third display screen may be at least partially exposed by the first portion.

In another broad aspect, each of the first part, the second part, and the third part may comprise a respective front surface. The first display screen may be on the front surface of the first part, the second display screen may be on the front surface of the second part, and the third display screen may be on the front surface of the third part. The first part may be configured to fold with respect to the second part about the first folding axis such that the front surface of the first part moves towards the front surface of the second part. The second part may be configured to fold with respect to the third part about a second folding axis in the second position such that the front surface of the second part moves towards the front surface of the third part.

In another broad aspect, in the second position, the respective front surfaces of the first, second and third parts may form a concave "U"-like shape, with the respective front surfaces of the first, second and third parts on the interior of the concave "U"-like shape.

In another broad aspect, the first portion may be configured to slide with respect to the second portion in a slide direction which is perpendicular to at least one of the first folding axis and the second folding axis.

In another broad aspect, the second portion may further comprise a fourth part, which provides at least a fourth display screen. The first portion may be configured to slide relative to the second portion between at least a first position and a second position; wherein in the first position, the third and fourth display screens are covered by the first portion; and wherein in the second position, at least one of the third and fourth display screens is at least partially exposed by the first portion. The third part of the second portion may be foldably coupled to the fourth part of the second portion to allow the third part to fold with respect to the fourth part about a third folding axis. In one embodiment, the second portion may comprise a hinge that foldably couples the third part to the fourth part.

In another broad aspect, each of the first part, the second part, the third part and the fourth part may comprise a respective front surface. The first display screen may be on the front surface of the first part, the second display screen may be on the front surface of the second part, the third display screen may be on the front surface of the third part, and the fourth display screen may be on the front surface of the fourth part.

In another broad aspect, the first part may be configured to fold with respect to the second part about the first folding axis such that the front surface of the first part moves towards the front surface of the second part. In the second position, the second part may be configured to fold with respect to the fourth part about a second folding axis. The third part may be configured to fold with respect to the fourth part about the third folding axis such that the front surface of the third part moves towards the front surface of the fourth part.

In another broad aspect, the second part may be configured to fold with respect to the fourth part about the second folding axis in the second position such that the front surface of the second part moves away from the front surface of the fourth part, and such that the respective front surfaces of the first, second, third, and fourth parts form a "W"-like shape, with the respective front surfaces of the first, second, third and fourth parts on the interior of the "W"-like shape.

In another broad aspect, the third display screen may provide a display area that is larger than a display area of each of the first display screen and the second display screen.

In another broad aspect, each of the first portion and the second portion may comprise a respective front surface, wherein the front surface of the first portion and the front surface of the second portion are substantially equal in area.

In another broad aspect, at least one of the first, second and third display screens may comprise a touch screen.

In another broad aspect, at least one of the first, second and third display screens may be configured to accept touch screen input when the first portion is in one of the first and second positions, but to not accept touch screen input when the first portion is in one other of the first and second positions.

Figure 4A:
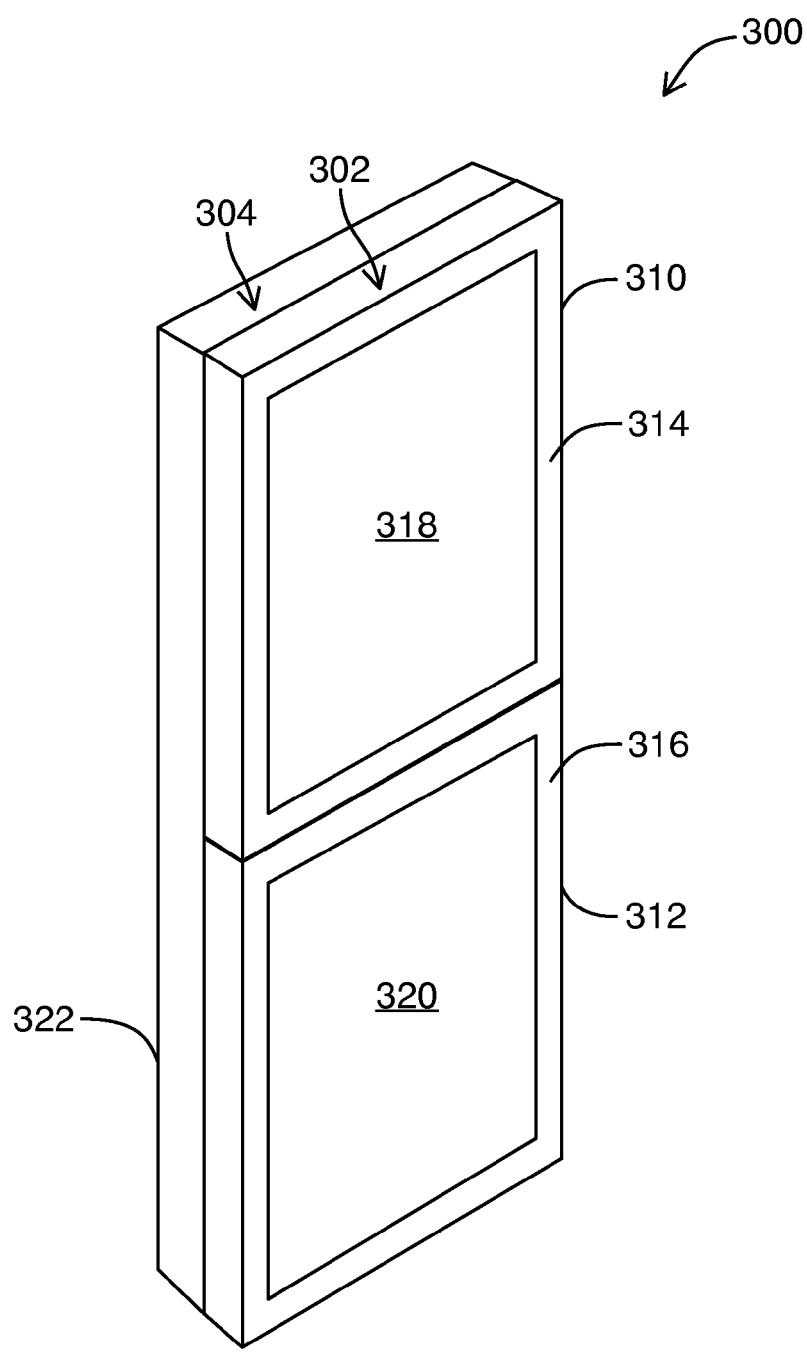
FIG. 4A is a perspective view of a mobile device according to one example embodiment, wherein a first portion is in a first position.
Figure 5A:
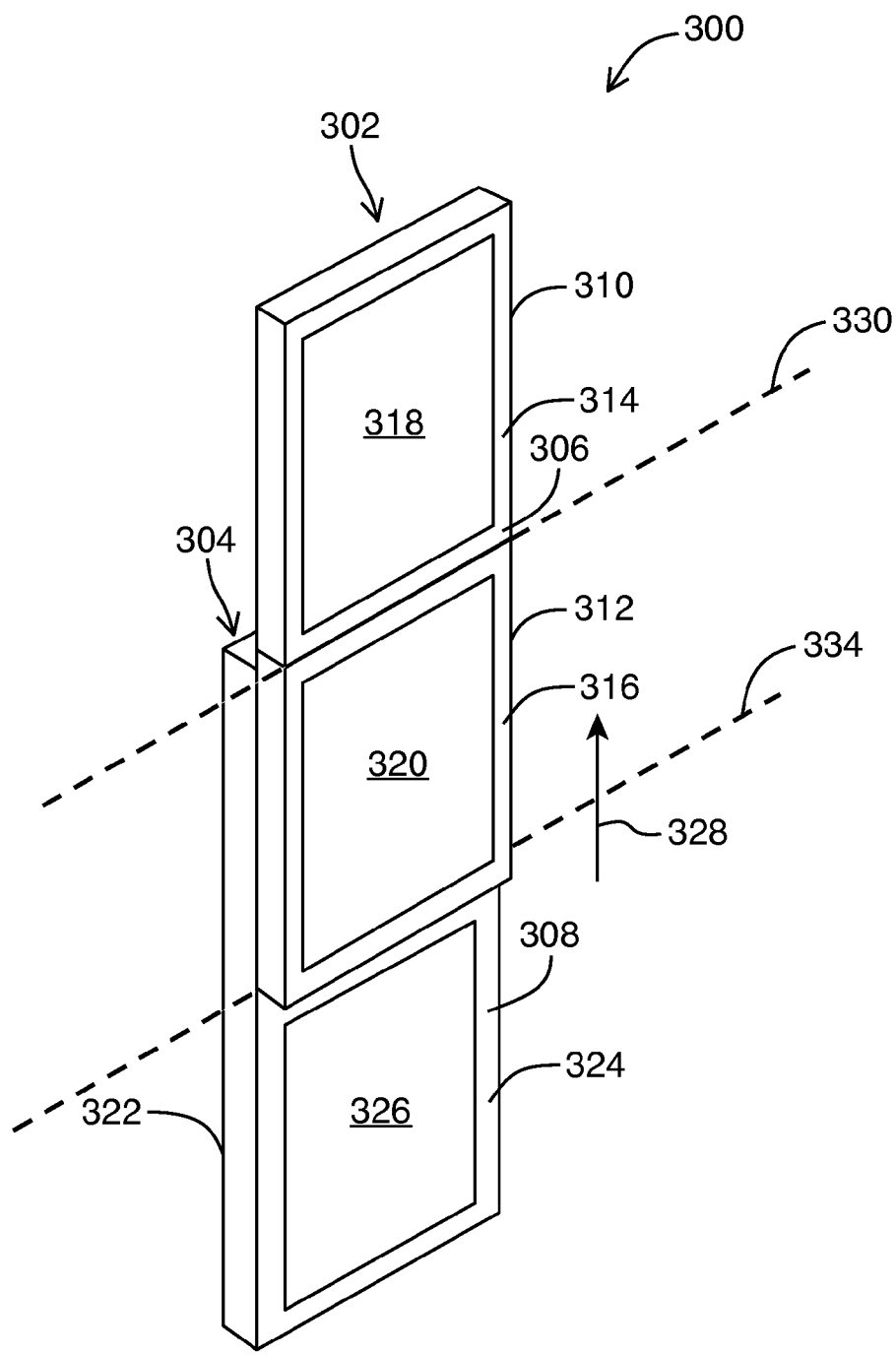
FIG. 5A is a perspective view of the mobile device of FIG. 4A, wherein the first portion is in a second position.
Figure 6A:
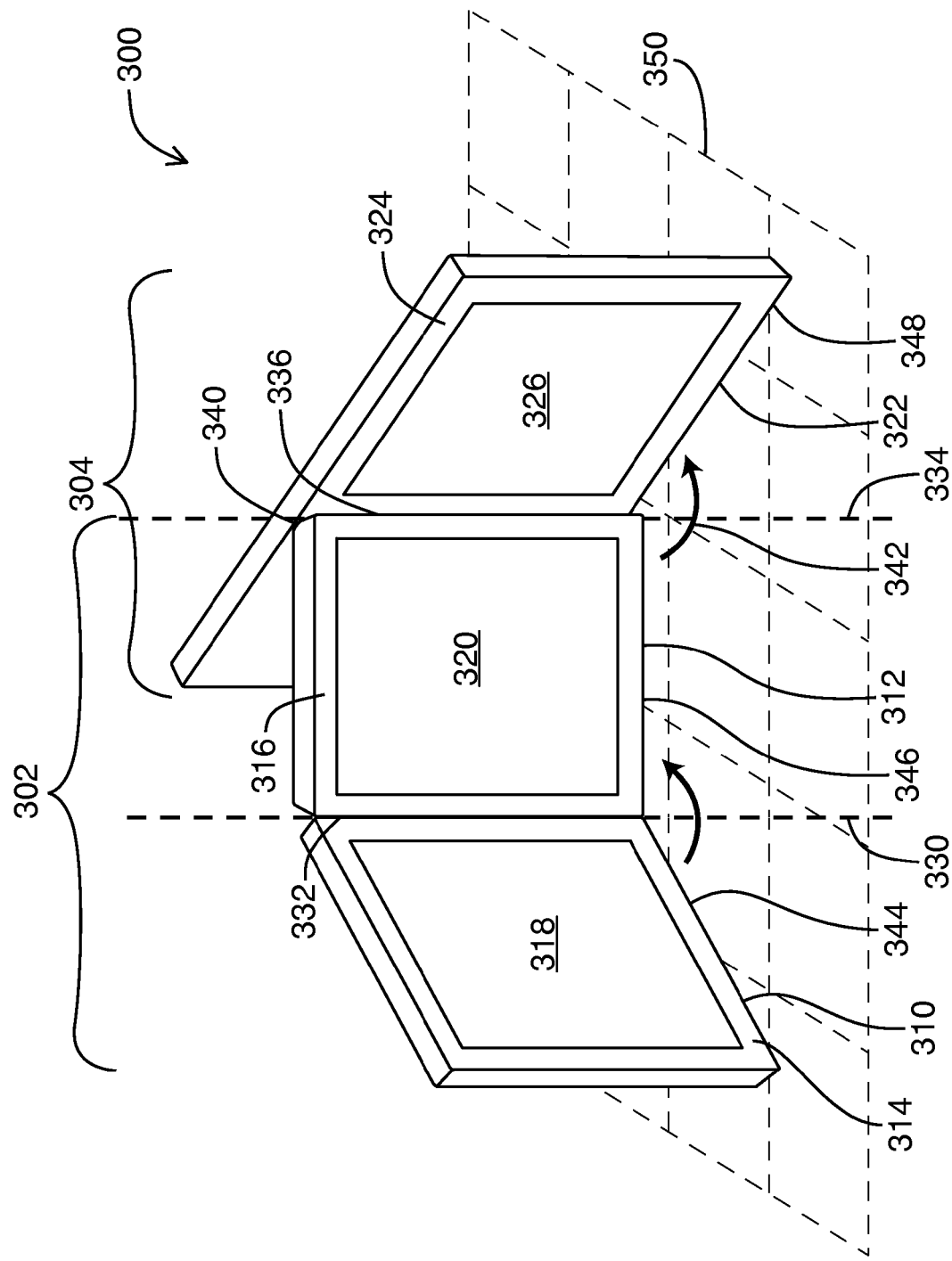
FIG. 6A is a perspective view of the mobile device of FIGS. 4A and 5A according to one example embodiment, wherein parts of the first portion are folded.

Referring now to FIGS. 4A, 5A and 6A, a perspective view of a mobile device 300 is shown, according to one example embodiment. The mobile device 300 may be the same kind of device as the mobile device 100 described above. The mobile device 300 comprises a first portion 302 and a second portion 304, each having a respective front surface 306, 308. The first portion 302 comprises at least a first part 310 and a second part 312. The first part 310 comprises a front surface 314 on which at least a first display screen 318 is provided. The second part 312 comprises a front surface 316 on which at least a second display screen 320 is provided. Similarly, the second portion 304 comprises at least a third part 322 with a front surface 324 on which at least a third display screen 326 is provided.

Figure 4B:
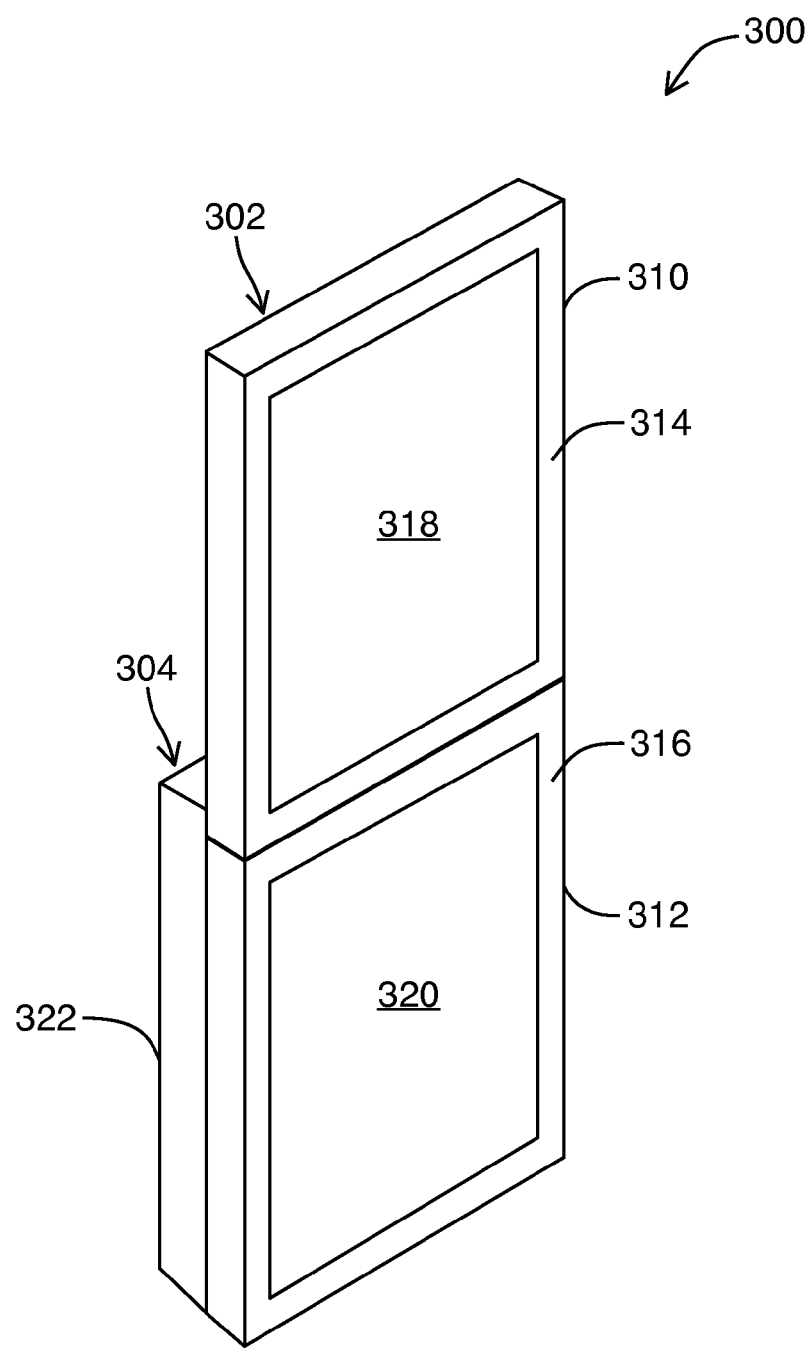
FIG. 4B is a perspective view of a mobile device according to a variant embodiment, wherein a first portion is in a first position.
Figure 5B:
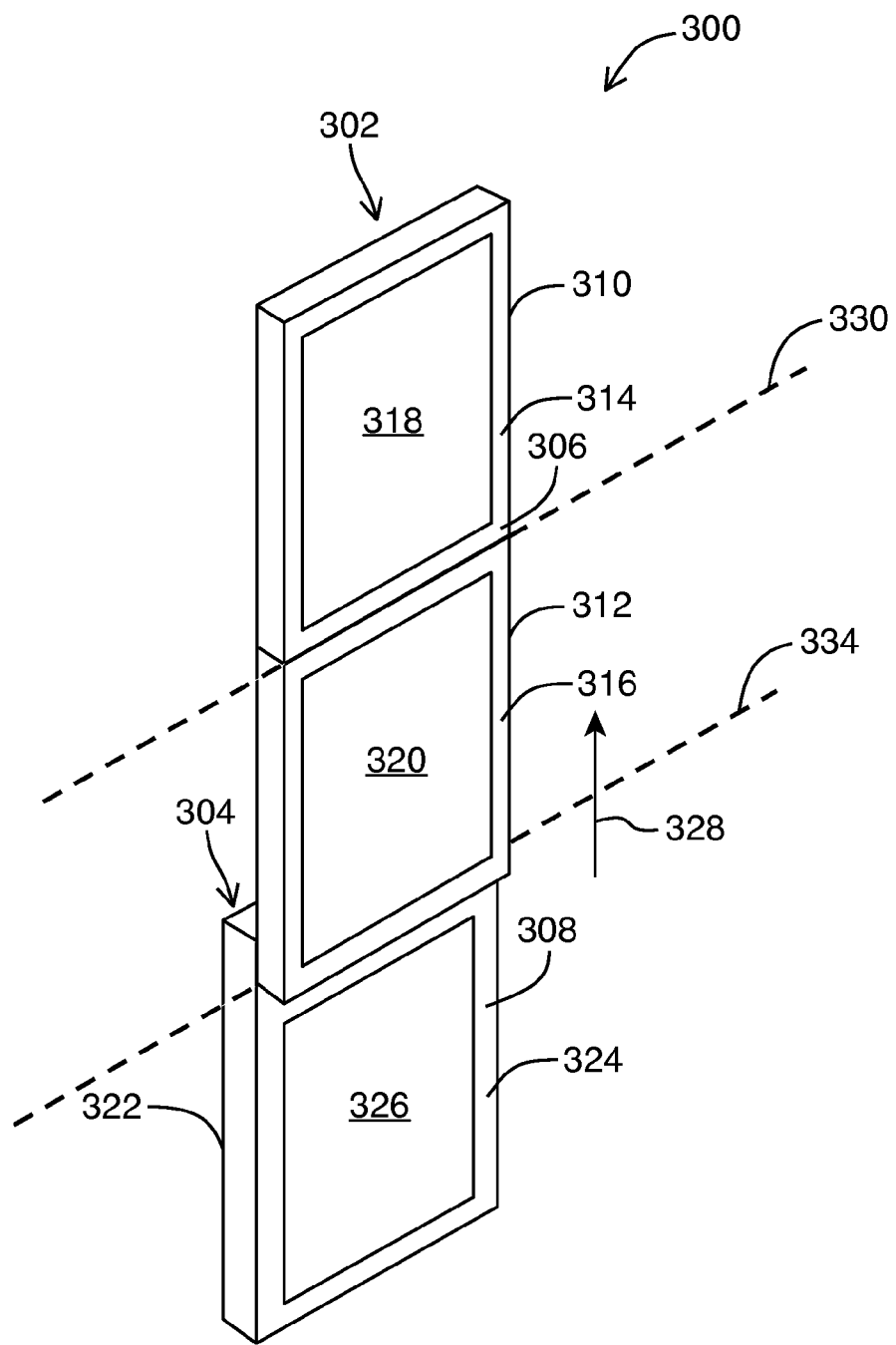
FIG. 5B is a perspective view of the mobile device of FIG. 4B, wherein the first portion is in a second position.
Figure 6B:
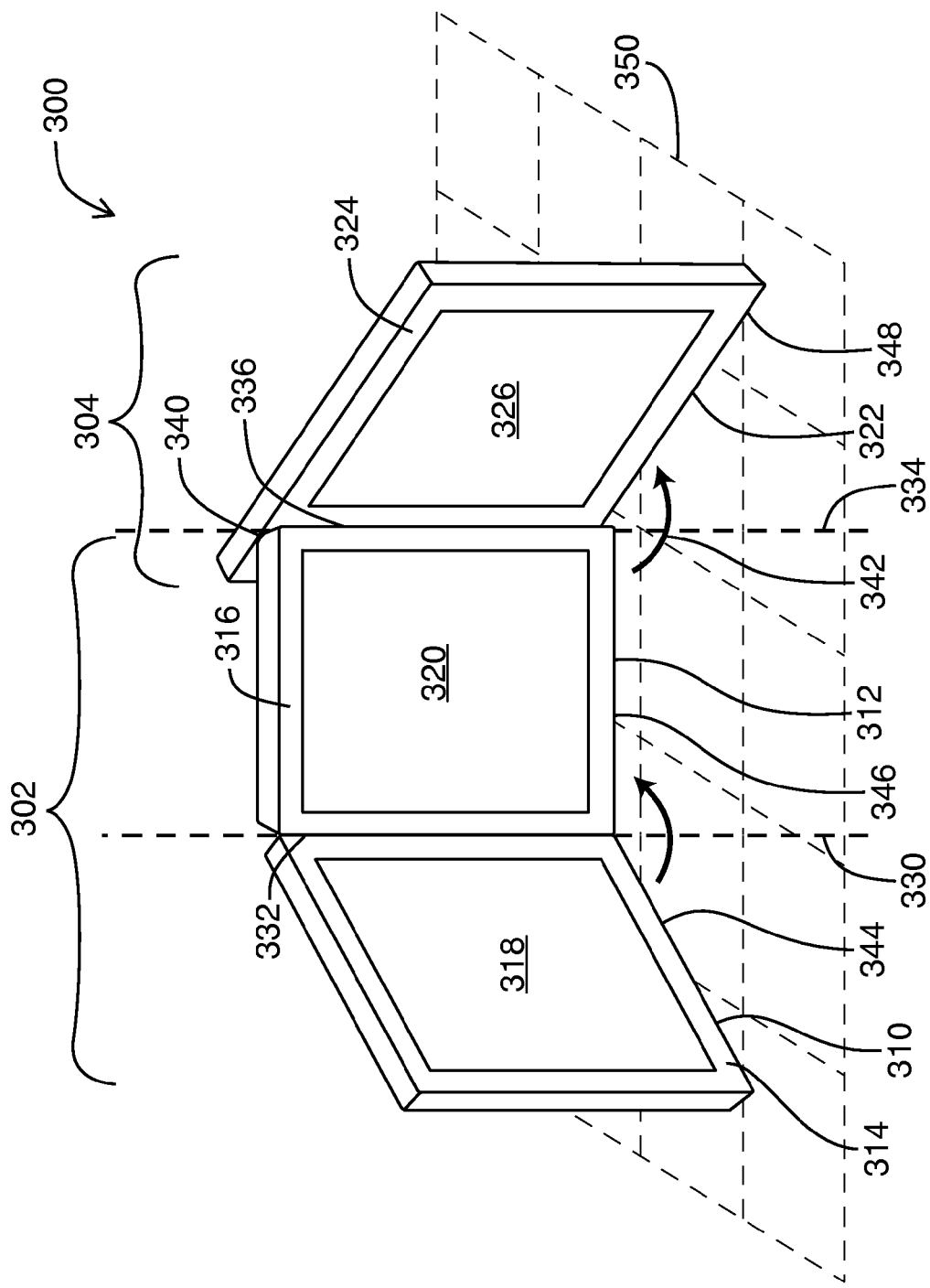
FIG. 6B is a perspective view of the mobile device of FIGS. 4B and 5B according to one example embodiment, wherein parts of the first portion are folded.

In the example embodiment illustrated with reference to FIGS. 4A, 5A and 6A, the first portion 302 and the second portion 304 may be of the same width and height as shown in FIG. 4A. However, in some embodiments, the width and/or height of the first portion 302 may different from the width and/or height of the second portion 304. For example, FIGS. 4B, 5B and 6B illustrate a perspective view of the mobile device 300 in accordance with another example embodiment, in which the height of the second portion 304 is shortened relative to the first portion 302. For ease of exposition, features of the example embodiment of FIGS. 4A, 5A and 6A are described herein in greater detail, although persons skilled in the art will understand that the described features will also apply to the example embodiment of FIGS. 4B, 5B, and 6B.

The thickness of the first portion 302 may or may not be different from the thickness of the second portion 304. The thickness of a given portion may depend on the type of components housed by that portion (e.g. a battery). For example, a battery compartment and/or SIM card compartment may be provided on the underside of the second portion 304.

In FIG. 4A, the first portion 302 is in a first position. In this first position, the user may interact with the display screens 318 and 320. For example, one display screen may be used to accept user input (e.g. a virtual keyboard may be provided on a touch screen), while the other display screen is used to view output of the mobile device 300. Alternatively, both display screens may be configured to provide output to the user. Other configurations may be possible.

As a further example, in this first position, the user may view a web page on one display screen while composing an e-mail message at the same time on a different display screen, or an initial message can be viewed in one display screen while a response is composed in another display screen In the first position, the first portion 302 is positioned in front of the second portion 304 and completely covers the third display screen 326 (FIG. 5A). The first portion 302 is slidably coupled to the second portion 304 such that the first portion 302 can slide in a slide direction 328 to a second position (shown in FIG. 5A) to at least partially expose the third display screen 326.

In one embodiment, the third display screen 326 is fully exposed when the first portion 302 is in the second position. Slidably coupling the first portion 302 to the second portion 304 may permit the mobile device 300 to selectively take on a more compact form for transportation and storage.

In the second position, the user may interact with the three display screens 318, 320, 326 simultaneously, which may facilitate multitasking. For example, one display screen may be used to accept user input (e.g. a virtual keyboard may be provided on a touch screen), while the other two display screens may be used to view output of the mobile device 300. Alternatively, all three display screens may be configured to provide output to the user. Other configurations may be possible.

As a further example, in this first position, the user may view a web page on one display screen while composing an e-mail message at the same time on a different display screen, or an initial message can be viewed in one display screen while a response is composed in another display screen. The user may interact with a different application on the third display screen.

The coupling (not shown) which permits the first portion 302 to slide with respect to the second portion 304 may be one that is known in the art. For example, there may be projections provided by one of the first and second portions 302, 304 which cooperate with tracks provided by the other of the first and second portions 302, 304 to direct the sliding motion of first portion 302 over the second portion 304. In some embodiments, projections and tracks may be provided on each of the first and second portions 302, 304, with the projections on one portion 302, 304 cooperating with tracks on the other portion 302, 304. The sliding mechanism may also be configured to limit the range in which first portion 302 is permitted to slide over second portion 304. For example, first portion 302 may only be permitted to slide a pre-determined distance after third display screen 326 is fully exposed (see e.g. FIG. 5A). Other sliding mechanisms may be employed in variant implementations.

The mobile device 300 is also configured to allow certain parts 310, 312, 322 to fold with respect to one another after the first portion 302 slides to the second position shown in FIG. 5A.

For example, FIG. 6A shows a perspective view of the mobile device 300 with the parts 310, 312, 322 folded inwardly. The first part 310 is foldably coupled to the second part 312 to allow the first part 310 to fold with respect to the second part 312 about a first folding axis 330. At least one of the first portion 302 and the second portion 304 comprises one or more coupling elements configured so that the second part 312 is foldable with respect to the third part 322 about a second folding axis 334.

Persons skilled in the art will understand that the first part 310 and the second part 312, as well as any other parts disclosed herein as being foldably coupled, may be so coupled using one or more coupling elements as may be known in the art. For example, a hinge 332 may couple the first part 310 and the second part 312 and permit them to fold with respect to one another. In some embodiments, the first part 310 and the second part 312 may be joined by a flexible member (not shown), which is adapted to bend when the first and second parts 310, 312 fold with respect to one another. In some embodiments, the first part 310 and the second part 312 may be provided as a single liquid crystal display (LCD) or organic light emitting diode (OLED) display, which may cover a mechanical hinge coupling the first part 310 to the second part 312. Accordingly, the first portion 302 may appear to provide one large screen that can flex so as to then appear to provide two separate screens. A hinge or other coupling element between the first part 310 and the second part 312 may be configured to allow the parts to fold relative to one another only up to a predetermined fold angle. Other coupling elements may be employed in variant embodiments.

Figure 6C:
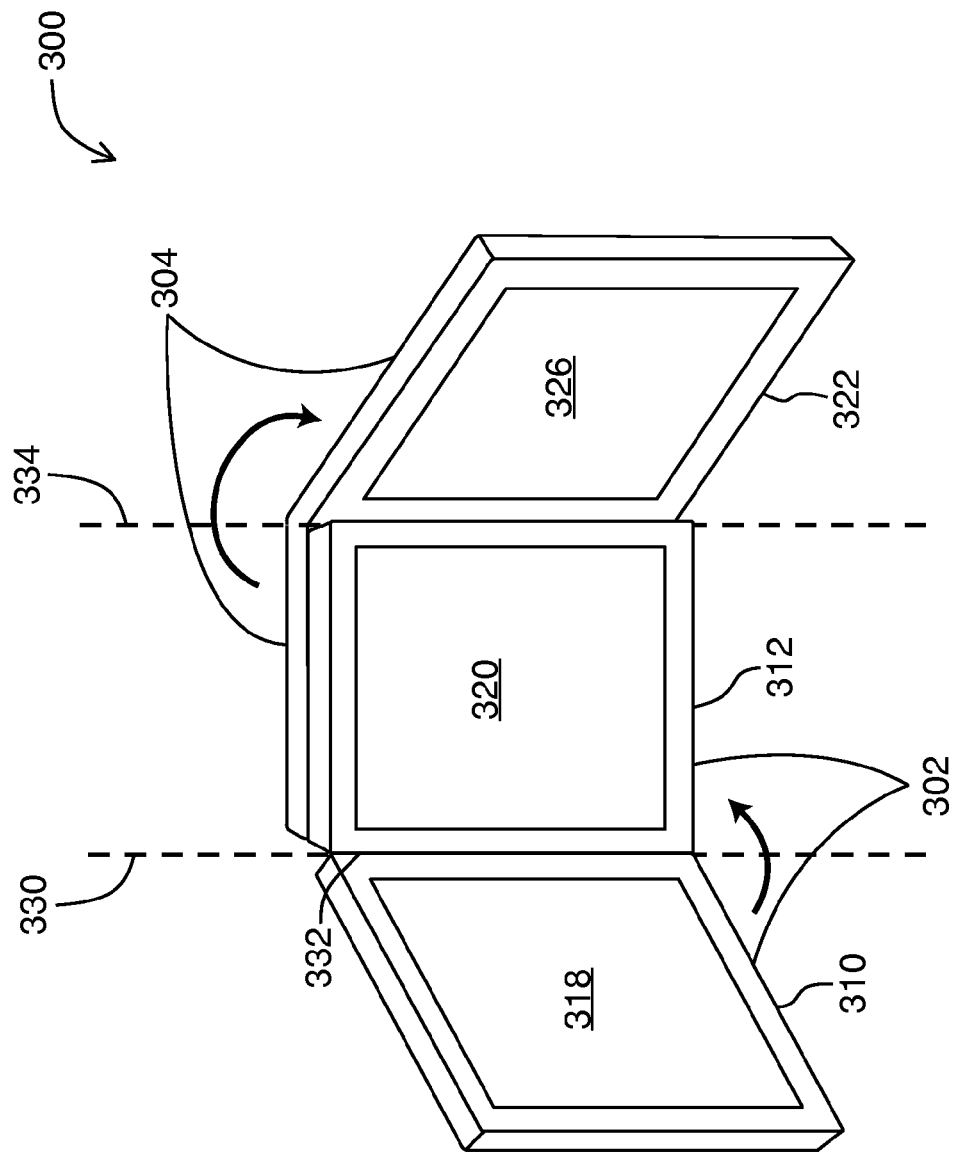
FIG. 6C is a perspective view of the mobile device of FIGS. 4A and 5A according to another example embodiment, wherein parts of the first portion and the second portion are folded.

The second and third parts 312, 322 of the first portion 302 may be foldably coupled by a second hinge 336 in some embodiments. In one embodiment, as shown in FIG. 6C, the second portion may comprise a hinge which is not connected to the first portion 302, and which enables the third part 322 to fold with respect to itself and the first part 312. A hinge or other coupling element between the second part 312 and the third part 322 may be configured to allow the parts to fold relative to one another only up to a predetermined fold angle.

In other embodiments, the second and third parts 312, 322 may not be hingedly coupled, and other coupling mechanisms may be employed. For example, referring to FIGS. 6D to 6F, a top view, a right side view, and a perspective view of the mobile device 300 of which the parts 310, 312, 322 have been folded inwardly (e.g. as shown in FIG. 6A), in accordance with another embodiment, are shown. These figures depict a mobile device 300 that provides coupling elements on the second portion 304, comprising a sliding portion 360 and a retractable arm 362. The sliding portion 360 may comprise a slot 364 for receiving the arm 362 prior to the folding of parts 310, 312, 322 (as in FIGS. 4A and 5A). One or more magnets 364 may be provided on the sliding portion 360 to hold the first portion 302 substantially flat against the second portion 304 prior to folding.

In use, first, when the mobile device 300 is in a first position where the first portion 302 has not been subject to sliding or folding relative to the second portion 304 (see e.g. FIG. 4A), the arm 362 settles in the slot 364 of the sliding portion 360 and may further slide into a cavity (not shown) provided underneath the screen 326 within the third part 322 for storage. The sliding portion 360 is stored within the second portion 304 and does not yet extend beyond the top edge of the second portion 304 (see e.g. FIG. 4A). Next, when the first portion 302 slides relative to the second portion 304 into a second position (see e.g. FIG. 5A), the arm 362 will move to occupy the end of the slot 364 towards the top end of the second portion 304. The slot is dimensioned so as to permit the first portion 302 to slide relative to the second portion 304 in order to reveal the third screen 326, but with the sliding portion 360 remaining stored within the second portion 304 such that it does not yet extend beyond the top edge of the second portion 304 (see e.g. FIG. 5A). Finally, to achieve the folding of the parts 310, 312, 322, a further sliding of the first portion 302 may be performed, such that the sliding portion 360 extends from the top edge of the second portion 304 in order to release the arm 362. The arm 362 is pivotally connected to the second portion 304 (or to the sliding portion 360), allowing the end of the second part 312 closest to the first part 310 to be elevated, and causing the end of the second part 312 closest to the third part 322 to rest on the second portion 304 (a beveled edge may be provided on the second part 312 that rests on the second portion 304 in certain embodiments), as shown in FIGS. 6E and 6F. The first part 310 may be folded with respect to the second part 312 to achieve a third position (see e.g. FIG. 6A). Coupling elements may be employed and configured to hold each part in its place, in the first, second and/or third positions.

Other coupling mechanisms may be employed in variant embodiments.

Figure 14:
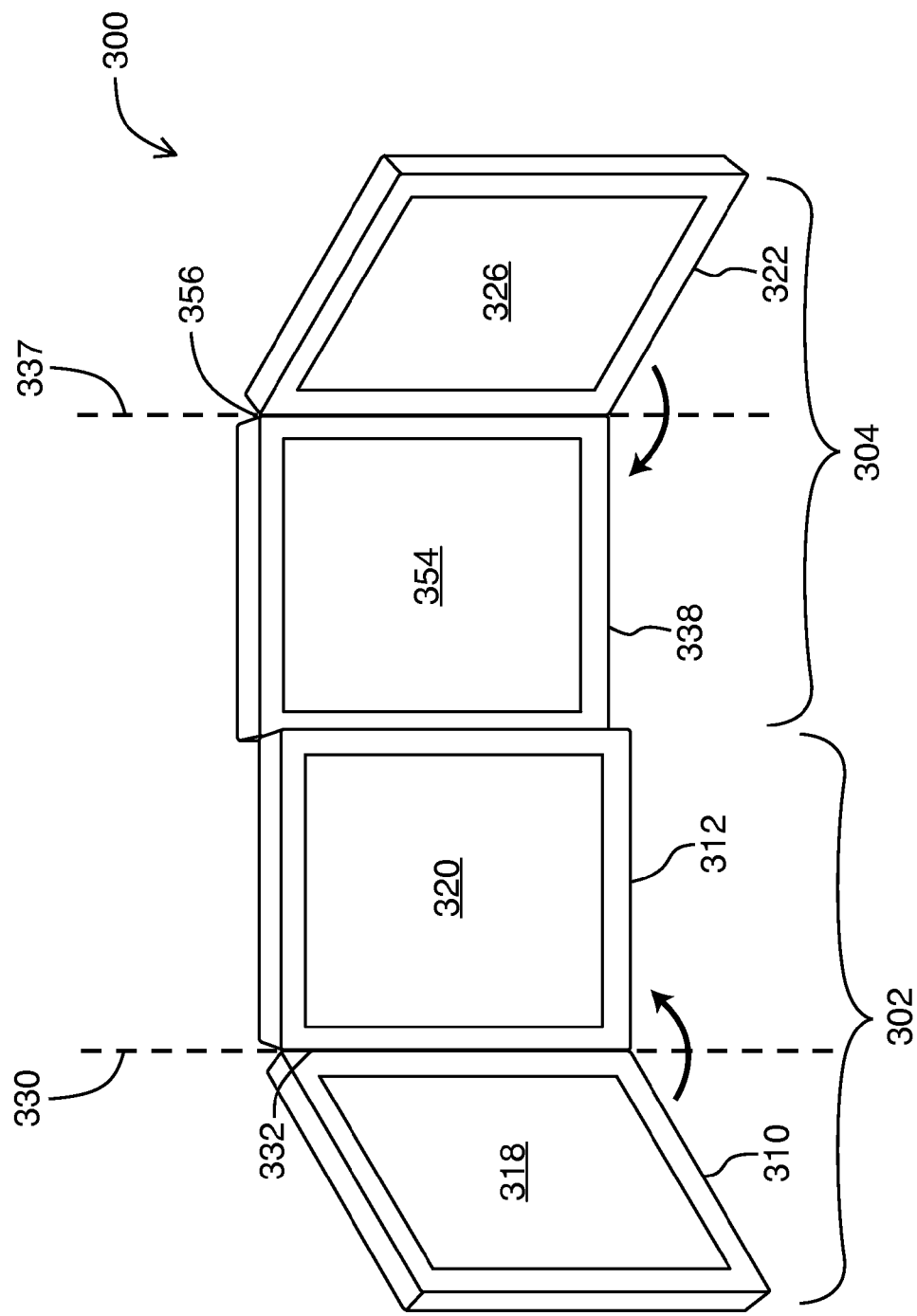
FIG. 14 is a perspective view of the mobile device of FIG. 13 wherein certain parts of the first portion and of a second portion are folded.

Persons skilled in the art will understand that the second part 312 and the third part 322 do not need to each comprise an edge directly aligned with a folding axis in order for them to fold with respect to one another about that folding axis. For example, as shown in FIG. 14, the second part 312 is folded with respect to the third part 322 about a third folding axis 337 even though the second part 312 does not comprises an edge which is directly in line with the third folding axis 337.

Some of the parts 310, 312, 322 may be configured to limit the maximum amount by which they may be folded with respect to the other parts 310, 312, 322. For example, the second part 312 may provide a contact surface 340 configured to abut the third part 322 and to stop the second part 312 from folding about the second folding axis 334 with respect to the third part 322. The size and shape of the contact surface 340 may be customized to stop the second part 312 from folding about the second folding axis 334 after a predetermined fold angle 342 between the second part 312 and the third part 322 is obtained. This may permit the second part 312 to be folded, with respect to the third part 322, at a predetermined fold angle 342 quickly and accurately. Also, the predetermined fold angle 342 may be selected to provide an optimal viewing angle for the display screens 318, 320, 326, when the mobile device 300 is to be used as a picture frame, for example.

For example, in the embodiment of FIG. 6A, a beveled edge on the second part 312 comprises the contact surface 340. In this embodiment, the shape and/or angle of the beveled edge may be designed to select a desired predetermined fold angle 342.

In a variant embodiment, the second part 312 may provide a contact surface 340 configured to mate with an indent (not shown) in the second portion 304 and to stop the second part 312 from folding about the second folding axis 334 with respect to the third part 322, after a predetermined fold angle 342 between the second part 312 and the third part 322 is obtained. The position and size of the indent and the contact surface 340 may be customized to selected a desired predetermined fold angle 342.

The parts 310, 312, 322 may be folded to form a concave "U"-like shape, with the respective front surfaces 314, 316, 324 of the first, second and third parts 310, 312, 322 on the interior of the concave "U"-like shape, as shown in FIG. 6A, for example. Persons skilled in the art will understand that references herein to a concave "U"-like shape do not require adjacent parts to be at right angles to each other. In one example, a "U"-like shape may comprise a concave shape with each interior angle being between 0 and 90 degrees exclusively. Each angle may be the same or different from the other angle(s).

When the first and second portions 302, 304 are positioned as shown in FIGS. 4A and 5A, the user may interact with the mobile device 300 using one or more of buttons (not shown), trackwheels (not shown), trackballs (not shown) or some other input device.

In at least one embodiment, one or more of the first, second and third display screens 318, 320, 326 may be touch screens adapted to receive touch screen input. For example, all three display screens 318, 320, 326 may be touch screens. In use, multiple applications may be executing on the mobile device 300, and each display screen may be associated with a different application.

In one embodiment, a given touch screen may be configured to accept or to not accept touch screen inputs depending on the relative positions of the first and second portions 302, 304. For example, when the first portion 302 is in the first position (FIG. 4A), one or both of the first and second display screens 318, 320 may be configured to accept touch screen inputs and the third display screen 326 may be configured to not accept touch screen inputs. When the first portion 302 is in the second position (FIG. 5A), the first and second display screens 318, 320 may be configured not to accept touch screen inputs and the third display screen 326 may be configured to accept touch screen inputs. The following table summarizes some of the possible ways the display screens 318, 320, 326 may be configured with respect to acceptance of touch screen inputs.

In certain implementations, the mobile device 300 may be operated when the parts are folded, with the mobile device resting on the underside of the second portion 304 upon a resting surface. In other words, the second portion 304 may act as a base, with the third display screen 326 accessible to receive user input (e.g. via virtual keys provided on the display screen 326) and parallel to the resting surface (e.g. a table). Display screens 318, 320 may then be folded towards the user, in a manner similar to the way a laptop might be used, except two screens are provided to display output to the user.

In some embodiments, the mobile device 300 may comprise sensors, configured to detect when the mobile device is turned on its side and/or folded, and the mobile device 300 may use these sensors to determine when the mobile device 300 is to operate as a picture frame in the digital picture frame mode.

| First Position | | | Second Position | | |
|---|---|---|---|---|---|
| First display screen (318) | Second display screen (320) | Third display screen (326) | First display screen (318) | Second display screen (320) | Third display screen (326) |
| Accept | Accept | Not accept | Not accept | Not accept | Not accept |
| Accept | Accept | Not accept | Not accept | Not accept | Accept |
| Accept | Accept | Not accept | Not accept | Accept | Not accept |
| Accept | Accept | Not accept | Accept | Not accept | Not accept |
| Accept | Accept | Not accept | Not accept | Accept | Accept |
| Accept | Accept | Not accept | Accept | Not accept | Accept |
| Accept | Accept | Not accept | Accept | Accept | Not accept |
| Accept | Accept | Not accept | Accept | Accept | Accept |
| Accept | Not accept | Not accept | Not accept | Not accept | Not accept |
| Accept | Not accept | Not accept | Not accept | Not accept | Accept |
| Accept | Not accept | Not accept | Not accept | Accept | Not accept |
| Accept | Not accept | Not accept | Not accept | Accept | Accept |
| Accept | Not accept | Not accept | Accept | Not accept | Accept |
| Accept | Not accept | Not accept | Not accept | Accept | Accept |
| Accept | Not accept | Not accept | Accept | Not accept | Accept |
| Accept | Not accept | Not accept | Accept | Accept | Not accept |
| Accept | Not accept | Not accept | Accept | Accept | Not accept |
| Not accept | Accept | Not accept | Not accept | Not accept | Not accept |
| Not accept | Accept | Not accept | Not accept | Not accept | Accept |
| Not accept | Accept | Not accept | Accept | Accept | Accept |
| Not accept | Accept | Not accept | Accept | Not accept | Not accept |
| Not accept | Accept | Not accept | Accept | Not accept | Accept |
| Not accept | Accept | Not accept | Accept | Not accept | Accept |
| Not accept | Accept | Not accept | Accept | Accept | Not accept |
| Not accept | Accept | Not accept | Accept | Accept | Not accept |
| Not accept | Accept | Not accept | Not accept | Accept | Not accept |

As discussed above, the first portion 302 is configured to slide with respect to the second portion 304 in the slide direction 328. The slide direction 328 may be perpendicular to one of the first folding axis 330 and the second folding axis 334. After sliding, the parts 310, 312, 322 of the first and second portion 302, 304 may be folded, as shown in FIG. 6A, for example. The mobile device 300 may then be rested on its side as shown. When oriented in this configuration, the device 300 may operate as a picture frame comprising multiple digital displays, for example. This may permit the mobile device 300 to take on different functionalities. For example, the mobile device 300 may be configured to operate as a mobile phone when the parts are not folded, and to operate as a picture frame (in a "digital picture frame mode") when the parts are folded and/or when the mobile device 300 is rested on its side. A different digital picture may be displayed in each display, for example. A clock showing the time may also be displayed in a display, for example.

In some embodiments, digital picture frame mode may be operated automatically, when the mobile device 300 is in the state of charging.

The mobile device 300 may be configured to enable or disable certain device functions when entering the digital picture frame mode. For example, when entering digital picture frame mode, the mobile device 300 may be configured to lock and disable phone functionality until the mobile device 300 is unlocked (e.g. upon a user entering a device password). This may permit a user to allow others to view the displayed pictures and to leave the mobile device 300 on their desk without risking that others will make unauthorized use of the mobile device 300. In some variants, the display screens 318, 320, 326 may be configured to accept touch screen inputs in digital picture frame mode. This may permit the user to change photos displayed on one or more of the display screens 318, 320, 326 or to swap positions of the photos already displayed on the display screens 318, 320, 326 by swiping their finger, for example. In some embodiments, the display screens 318, 320, 326 may be configured to not accept touch screen inputs while the mobile device 300 is in digital picture frame mode. This may prevent a change of the photos being displayed without the authorization of the device owner or access to device functions, for example, In at least one embodiment, at least two, of an edge 344 of the first part, an edge 346 of the second part and an edge 348 of the third part lie in the same plane 350 so that the mobile device 300 is stable and self-supporting when it is rested on a flat surface, for use as a picture frame, for example. In some variants, all three edges 346, 348, 350 may lie in the same plane 350. When the mobile device 300 is placed on its side on a flat surface (e.g. for use as a picture frame), at least one of the first and second folding axes 330, 334 may be normal to the plane 350. Persons skilled in the art will understand that to rest on a surface, only three discrete points or else a single planar surface of one or more of the edges 344, 346, 348 of the first, second and third parts 310, 312, 322 need to lie in the same plane 350. In some embodiments, legs or feet (not shown) may be provided on one or more of the parts 310, 312, 322 to support the mobile device 300 when it is resting on its side.

Figure 7:
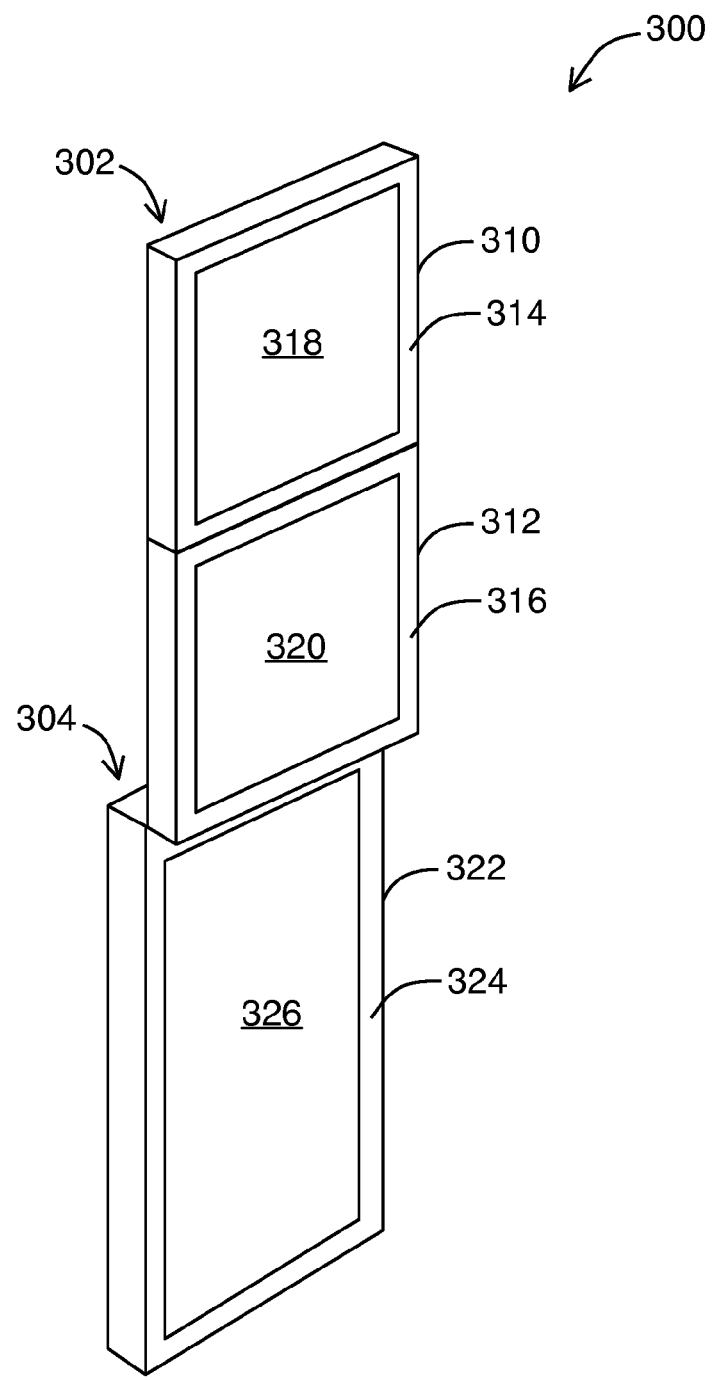
FIG. 7 is a perspective view of a mobile device according to another example embodiment, wherein a first portion is in a second position.
Figure 8:
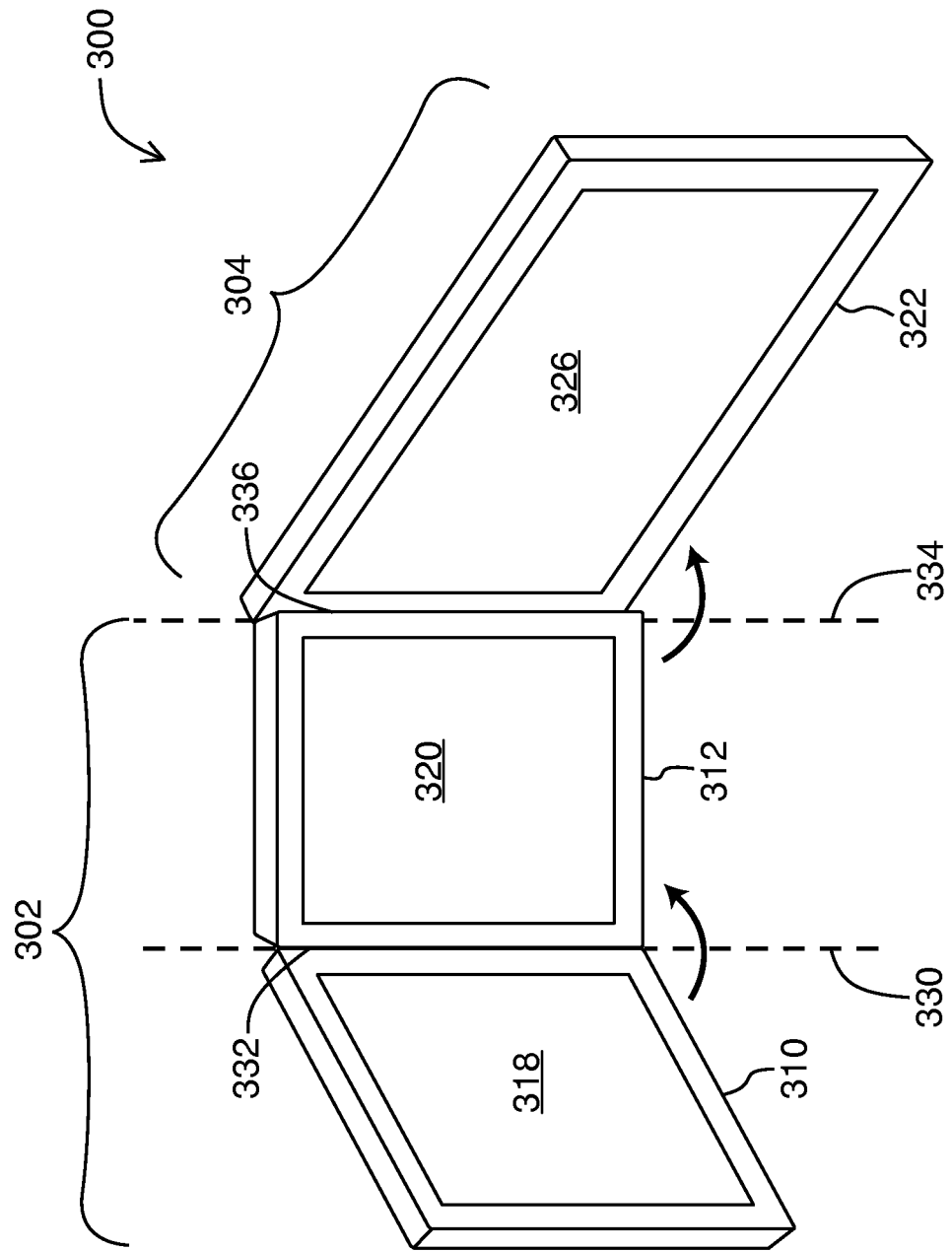
FIG. 8 is a perspective view of the mobile device of FIG. 7, wherein parts of the first portion are folded.
Figure 9:
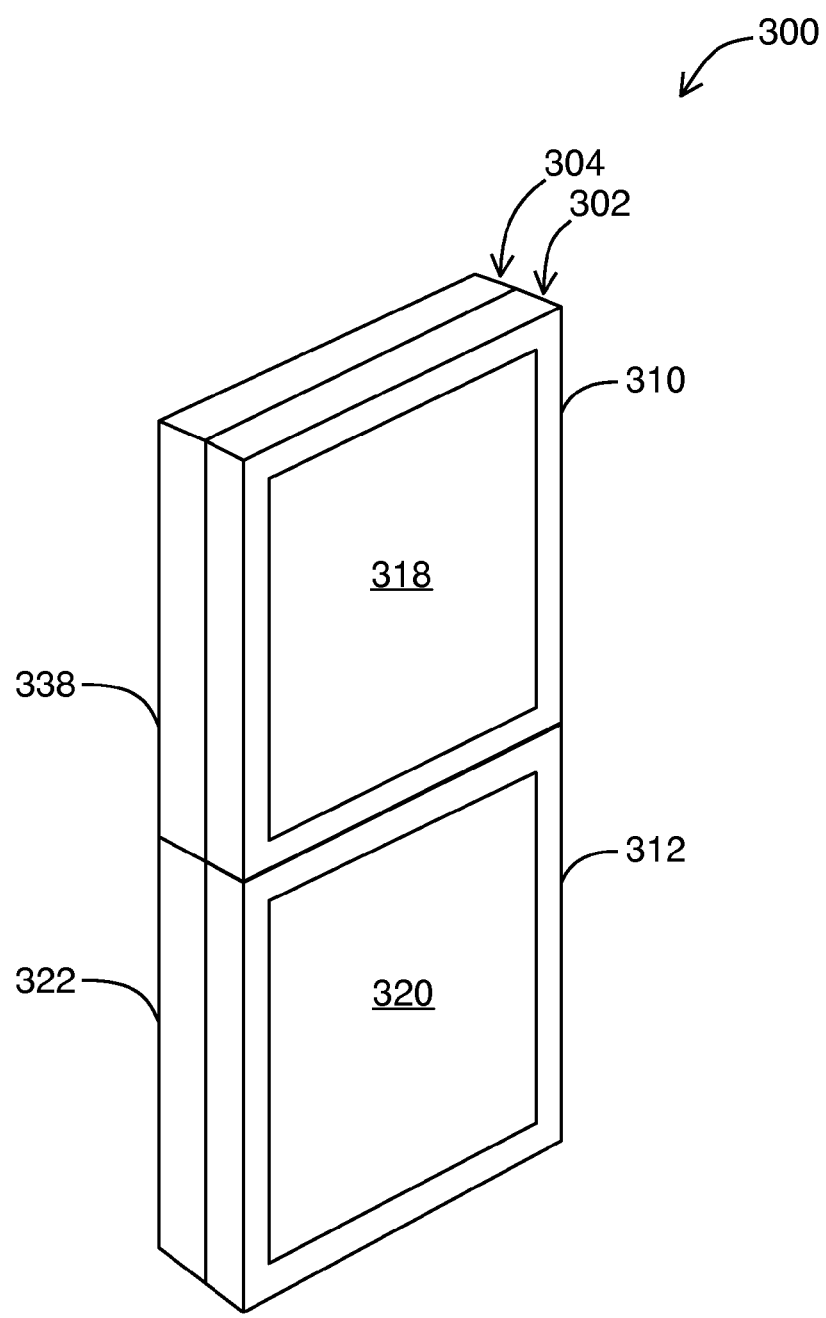
FIG. 9 is a perspective view of a mobile device according to another example embodiment, wherein a first portion is in a first position.
Figure 10:
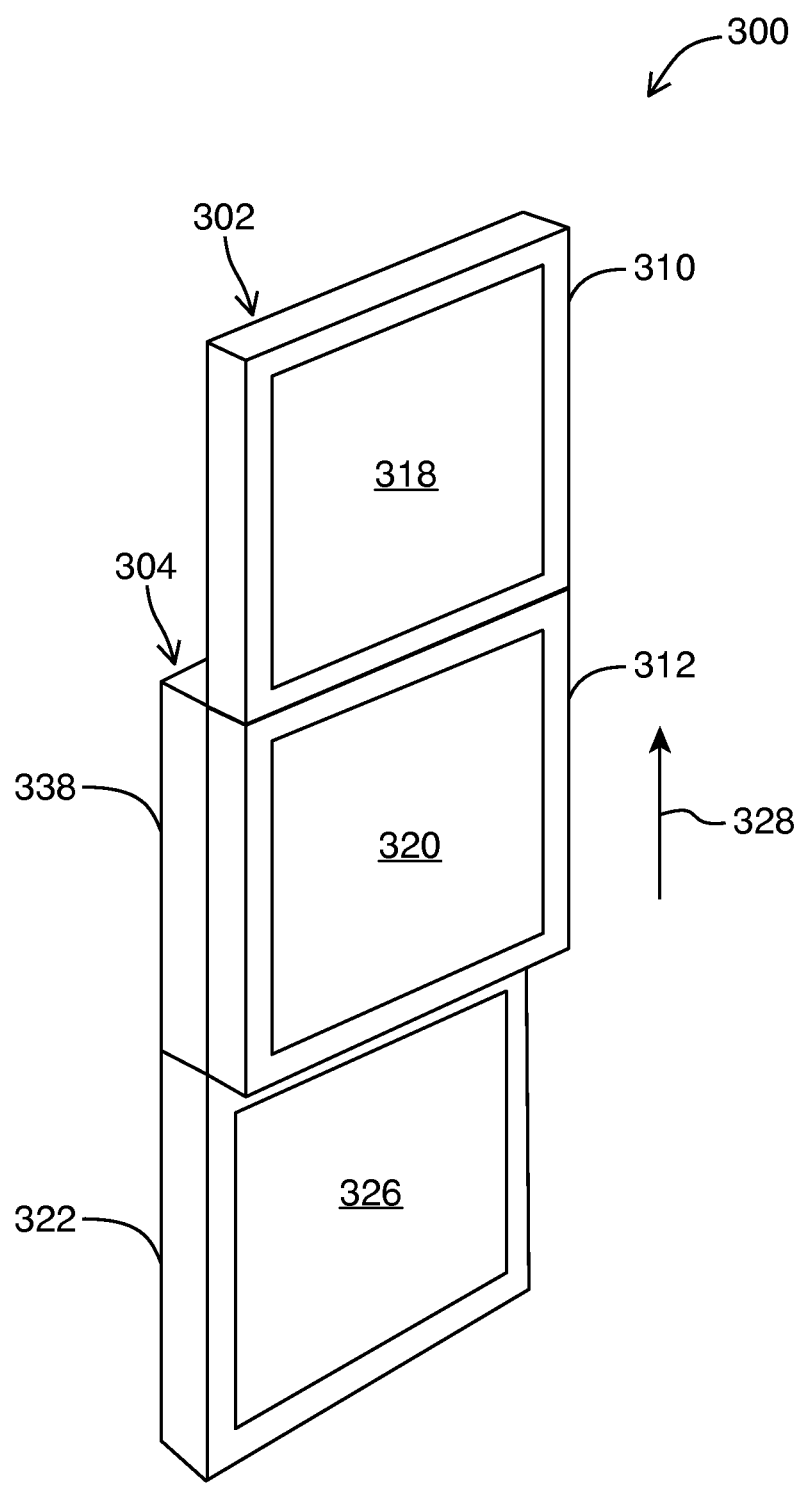
FIG. 10 is a perspective view of the mobile device of FIG. 9 wherein the first portion is in a second position.

FIGS. 7 and 8 show perspective views of the mobile device 300 with unequally display areas, in a variant embodiment. For example, FIGS. 7 and 8 show an embodiment where the third display screen 326 provides a larger display area than each of the first display screen 318 and the second display screen 320.

Referring now to FIGS. 9 to 17, there are shown perspective views of the mobile device 300 having a second portion 304 with the fourth part 338, according to at least one other embodiment. The fourth part 338 may comprise a front surface 352 on which a fourth display screen 354 is provided.

Details provided above with respect to the three-part mobile device may be applicable by extension to a four-part mobile device, such as that illustrated in FIGS. 9 to 17. For example, details with respect to hinges, coupling elements, sliding mechanisms, digital picture frame modes, contact surfaces, touch screen inputs, alignment of edges, and sizing of parts and/or portions as previously described, may be extended to the four-part mobile device embodiments described below. The reader is directed to earlier parts of the description for details.

For example, embodiments of the mobile device 300 having four parts may be configured to operate as a mobile device when the parts are not folded, and to operate as a picture frame (e.g. in "digital picture frame mode") when at least some of the parts are folded relative to one another. As previously noted, the mobile device 300 may comprise sensors (not shown) configured to detect when the mobile device 300 is turned on its side and/or folded, and the mobile device 300 may use these sensors to determine when the mobile device 300 is to enter the digital picture frame mode.

Figure 13:
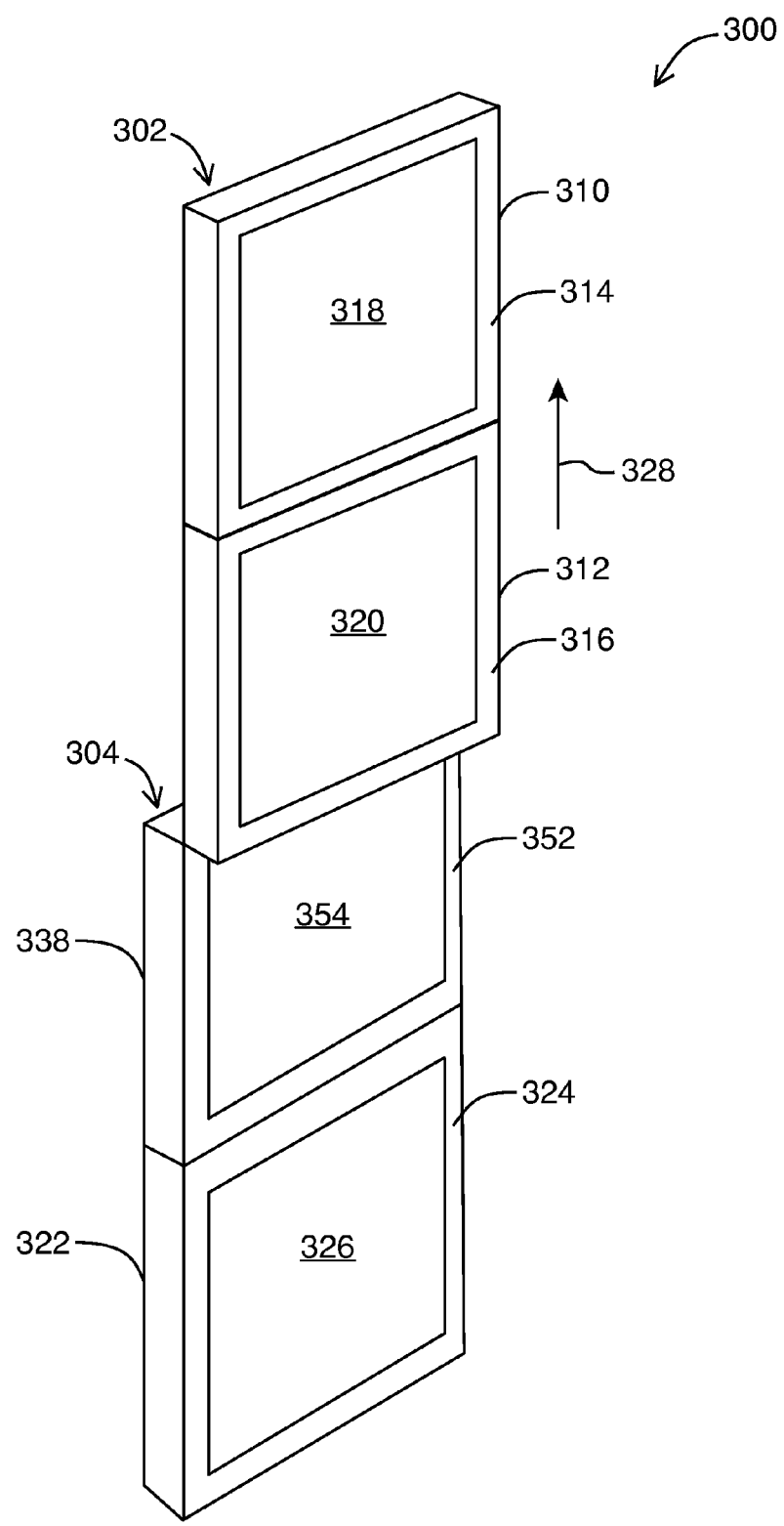
FIG. 13 is a perspective view of a mobile device according to another example embodiment, wherein a first portion is in a second position.

The first portion 302 is slidably coupled to the second portion 304 such that the first portion 302 can slide in a slide direction 328 to expose at least a part of the third display screen 326 (FIG. 10) or to expose at least a part of both the third and fourth display screens 326, 354 (FIG. 13). In the example shown in FIG. 10, the third display screen 326 is fully exposed and in the example shown in FIG. 13, both the third and fourth display screens 326, 354 are fully exposed.

Figure 11:
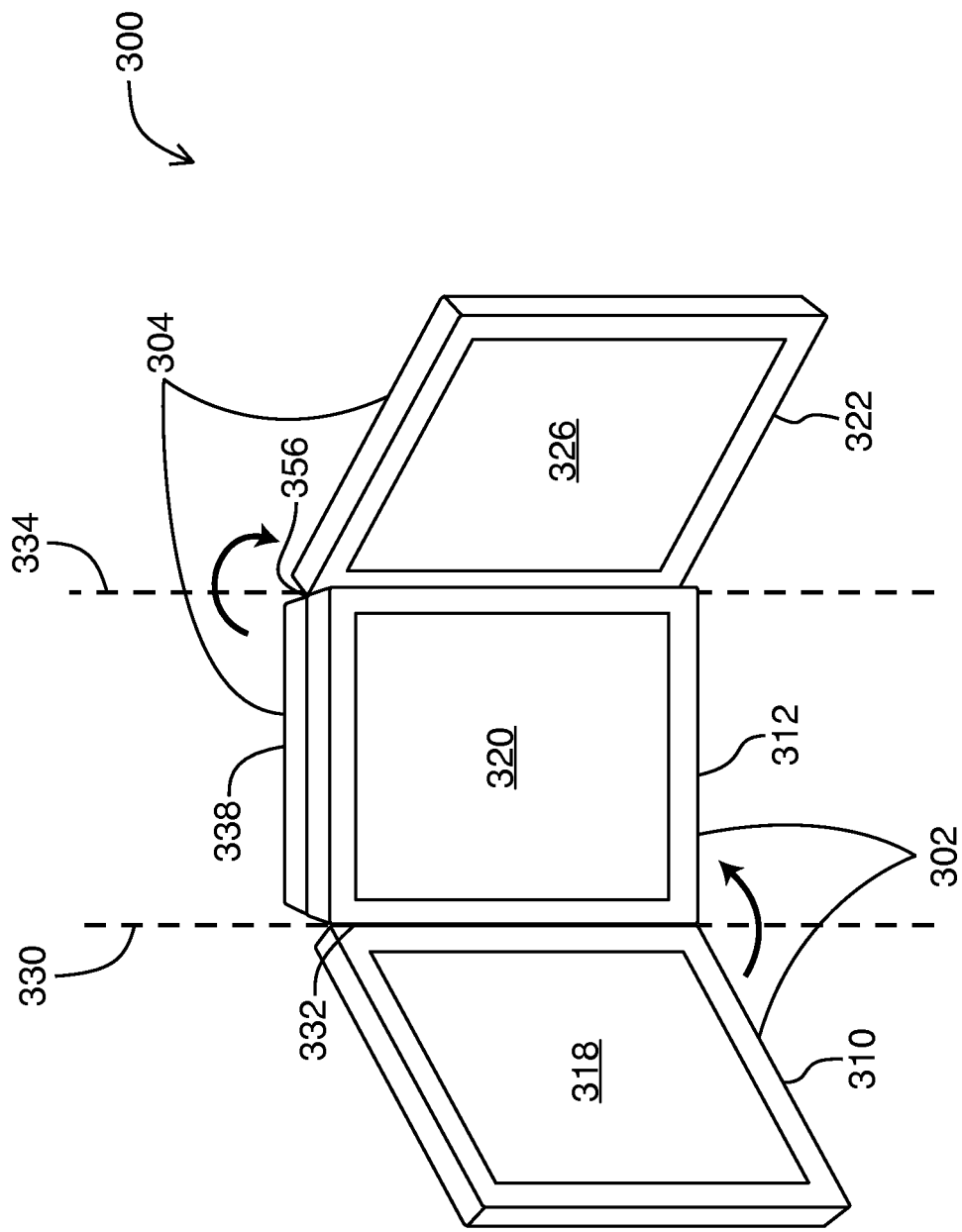
FIG. 11 is a perspective view of the mobile device of FIG. 10 wherein parts of the first portion and a second portion are folded.
Figure 12:
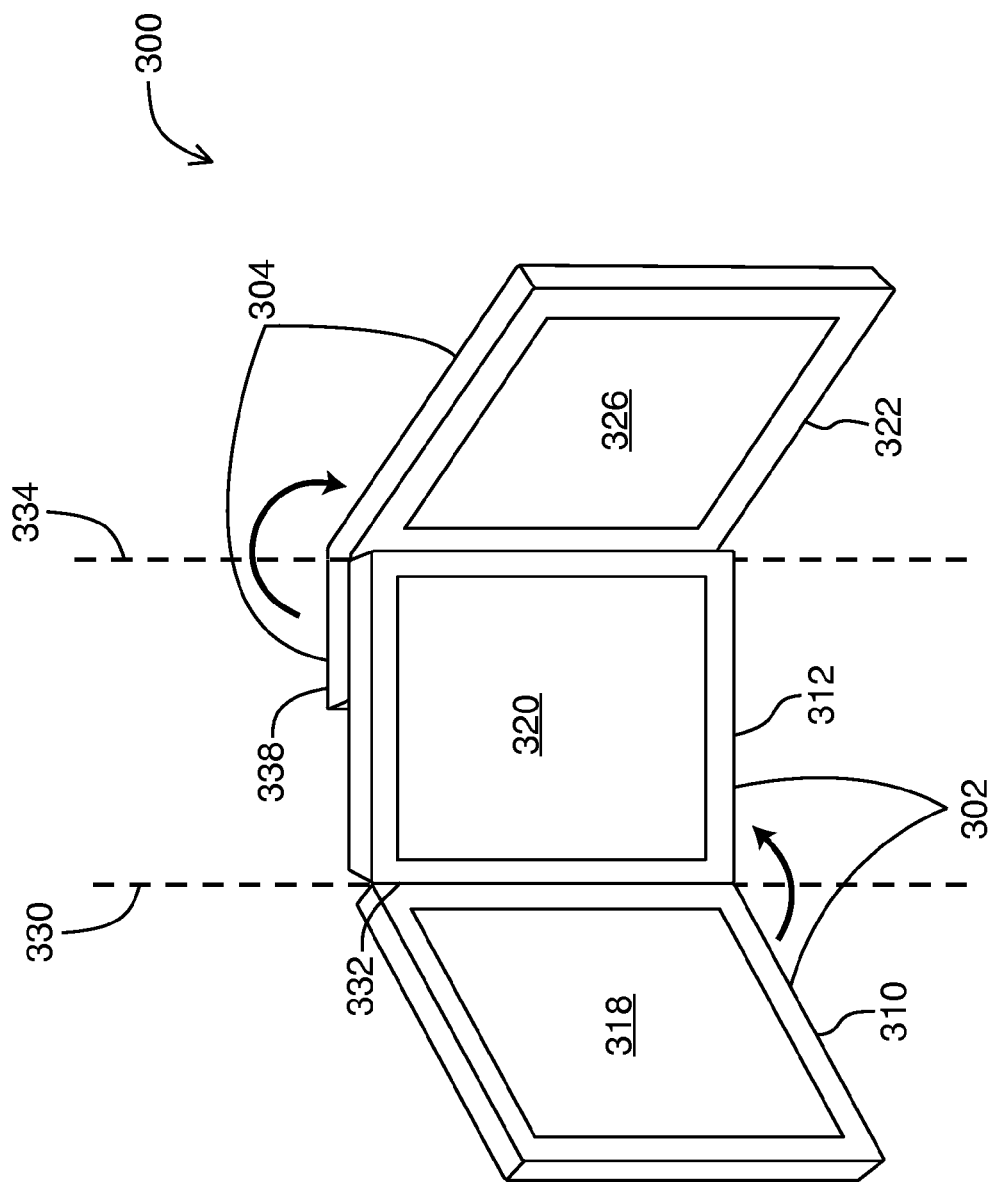
FIG. 12 is a perspective view of a mobile device according to another example embodiment, wherein parts of a first and of a second portion are folded.

The first part 310 is foldably coupled to the second part 312 to allow the first part 310 to fold with respect to the second part 312 about the first folding axis 330 (see e.g. FIGS. 11 and 12). Further, at least one of the first portion 302 and the second portion 304 comprises one or more coupling elements configured so that the second part 312 is foldable with respect to the third part 322 about the second folding axis 334 (see e.g. FIGS. 11 and 12).

FIG. 14 shows an embodiment where the first and second parts 310, 312 are foldably coupled to allow the first part 310 to rotate with respect to the second part 312 about the first folding axis 330. Further, the third and fourth parts 322, 338 of the second portion 304 may comprise one or more coupling elements, which may be configured to permit the third part 322 to fold with respect to the second and fourth parts 312, 338. In this embodiment, the second part 312 and the fourth part 338 may not be folded with respect to each other.

Figure 15:
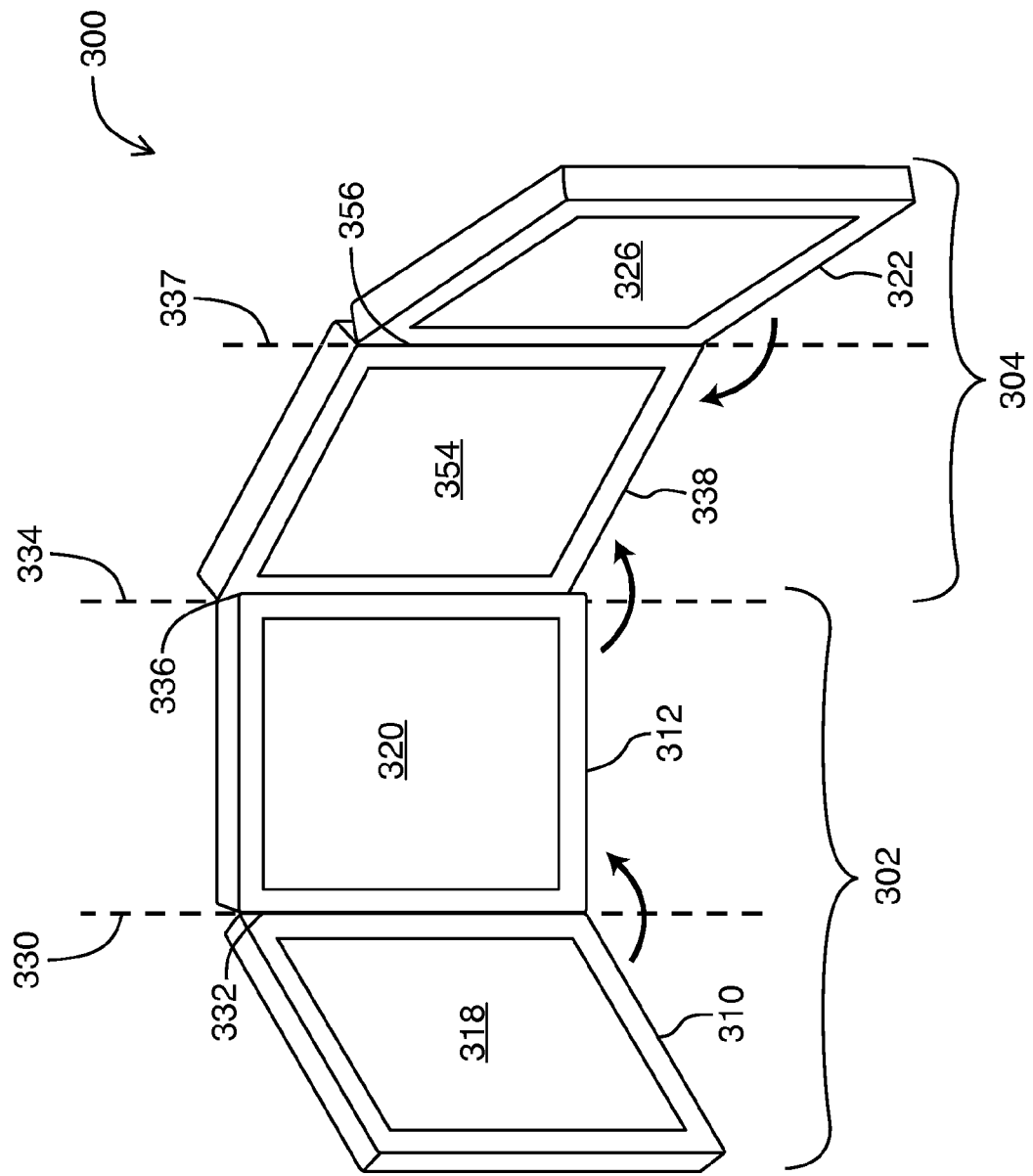
FIG. 15 is a perspective view of the mobile device of FIG. 13 wherein certain parts of the first and second portions are folded.

In another example, coupling elements between the second and fourth parts 312, 338 may be configured to permit both the third and fourth parts 322, 338 to fold with respect to the second part 312, and the coupling elements between the third and fourth parts 322, 338 may be configured to permit the third part 322 to fold with respect to the second and fourth parts 312, 338, as shown in FIG. 15.

Figure 16:
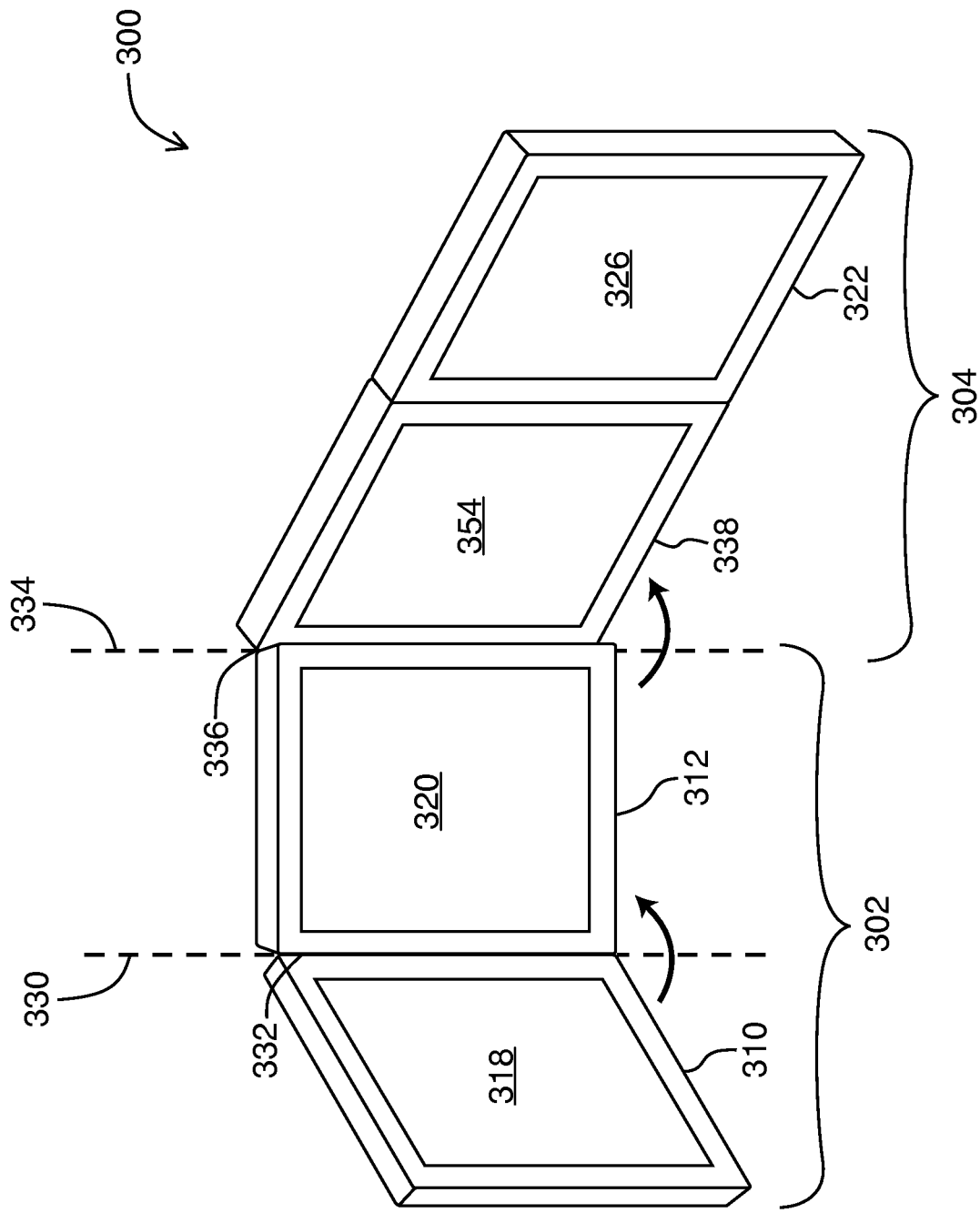
FIG. 16 is a perspective view of the mobile device of FIG. 13 wherein certain parts of the first and second portions are folded.

In another example, FIG. 16 shows an embodiment where the second and the fourth parts 312, 338 are foldably coupled and may comprise the one or more coupling elements. In this example, the coupling elements may be configured to permit the third and fourth parts 322, 338 to fold with respect to the second part 312, even where the third part 322 is not folded with respect the fourth part 338.

Figure 17:
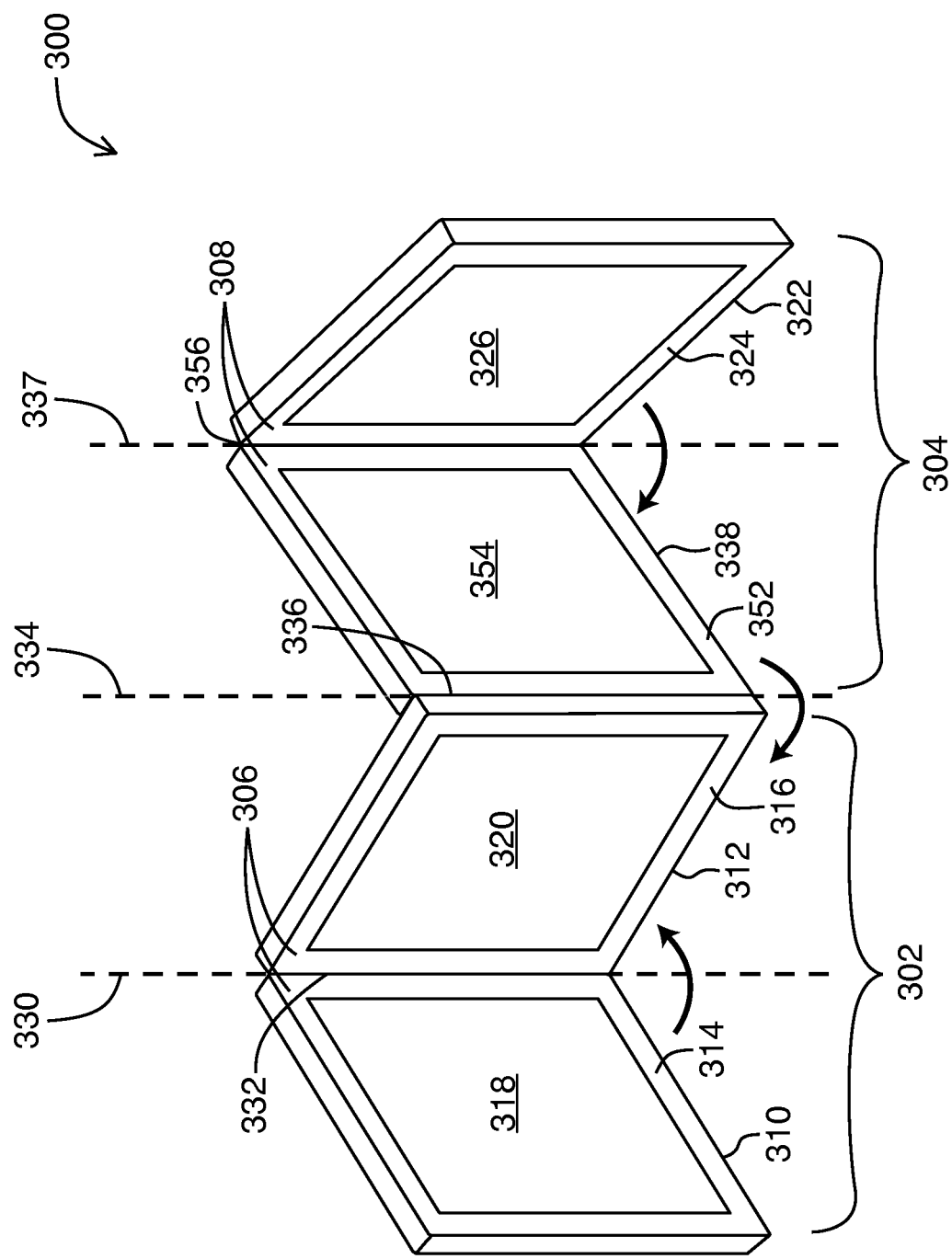
FIG. 17 is a perspective view of the mobile device of FIG. 13 wherein certain parts of the first and second portions are folded.

The parts disclosed herein as being foldably coupled may be configured to fold with respect to one another by the rotation of at least one part about a folding axis. Persons skilled in the art will understand that the rotation of the at least one part about a folding axis may be in one or both of a clockwise and a counterclockwise direction. For example, as shown in FIG. 17, the first part 310 may be configured to fold with respect to the second part 312 about the first folding axis 330 such that the front surface 314 of the first part 310 moves towards the front surface 316 of the second part 312. The second part 312 may be configured to fold with respect to the fourth part 338 about a second folding axis 334 such that the front surface 316 of the second part 312 moves away from the front surface 352 of the fourth part 338. The third part 322 may be configured to fold with respect to the fourth part 338 about the third folding axis 337 such that the front surface 324 of the third part 322 moves towards the front surface 352 of the fourth part 338. In this example embodiment, the respective front surfaces 314, 316, 324, 352 of the first, second, third and fourth parts 310, 312, 322, 338 may form a "W"-like shape, with the respective front surfaces 314, 316, 324, 352 on the interior of the "W"-like shape.

In variant embodiments, the first and second parts 310, 312 of the first portion 302 may not be foldably coupled while other parts, such as the second and fourth parts 312, 338 and/or the fourth and third parts 338, 322 may be foldably coupled.

In any of the above examples, the coupling elements may comprise one or more hinges 356, 334, for example. In some embodiments, the first part 310 and the second part 312 may be joined by a flexible member (not shown), which is adapted to bend when the first and second parts 310, 312 fold with respect to one another. In some embodiments, the third part 322 and the fourth part 338 may be joined by a flexible member (not shown), which is adapted to bend when the third and fourth parts 322, 338 fold with respect to one another.

In some embodiments, the first part 310 and the second part 312 may be provided as a single liquid crystal display (LCD) or organic light emitting diode (OLED) display, which may cover a mechanical hinge coupling the first part 310 to the second part 312. Accordingly, the first portion 302 may appear to provide one large screen that can flex so as to then appear to provide two separate screens. A hinge or other coupling element between the first part 310 and the second part 312 may be configured to allow the parts to fold relative to one another only up to a predetermined fold angle. In some embodiments, the third part 322 and the fourth part 338 may be provided as a single liquid crystal display (LCD) or organic light emitting diode (OLED) display, which may cover a mechanical hinge coupling the third part 322 to the fourth part 338. Accordingly, the second portion 304 may appear to provide one large screen that can flex so as to then appear to provide two separate screens. A hinge or other coupling element between the third part 322 and the fourth part 312 may be configured to allow the parts to fold relative to one another only up to a predetermined fold angle.

Persons skilled in the art will understand that the various parts, front surfaces and display screens need not be equally sized. For example, as shown in the embodiment of FIG. 12, the fourth part 338 is smaller than each of the other parts 310, 312, 322. Further, the fourth display screen 354 and the front surface 352 of the fourth part 338 may be smaller than each of the other display screens 318, 320, 326 and front surfaces 314, 316, 324 respectively.

In variant embodiments, one or more of the parts 310, 312, 322, 338 may not comprise a display screen (not shown). The part may instead comprise a physical keyboard, a trackpad, or a slot for a physical picture to be inserted, for example.

In variant embodiments, the mobile device 300 may comprise more than four parts, such as five parts or six parts. Details provided above with respect to the three-part and four-part mobile device embodiments may be applicable by extension to a mobile device with a greater number of parts.

Although the Figures primarily depict the portions of the mobile device 300 and the parts thereof as generally four-sided in the embodiments described herein, it shall be understood that this is for ease of illustration only, and is not meant to limit the scope of the appended claims. For example, one or more corners of any portion 302, 304, or of any part 310, 312, 322, 338 may not be square, and may be rounded and/or beveled, for example (see e.g. FIGS. 6D to 6F). As a further example, one or more sides of any portion 302, 304, or of any part 310, 312, 322, 338 may be curved and/or notched, in some implementations.

As used herein, the wording "and/or" is intended to represent an inclusive-or. For example "X and/or Y" is intended to mean X or Y or both. As a further example, "X, Y, and/or Z" is intended to mean X or Y or Z or any combination thereof.

A mobile device comprising a plurality of displays has been described with regard to a number of embodiments. However, it will be understood by persons skilled in the art that other variants and modifications may be made without departing from the scope of the disclosure as defined in the claims appended hereto.

The invention claimed is:

1. A mobile device comprising:
a first portion comprising a first part providing at least a first display screen, and a second part providing at least a second display screen, wherein the first part is foldably coupled to the second part to allow the first part to fold with respect to the second part about a first folding axis; and
a second portion comprising a third part providing at least a third display screen;
wherein the first portion is slidably coupled to the second portion; and
wherein at least one of the first portion and the second portion comprises one or more coupling elements configured so that the second part of the first portion is foldable with respect to the third part of the second portion about a second folding axis.

2. The mobile device of claim 1, wherein at least two of an edge of the first part, an edge of the second part, and an edge of the third part lie in a same plane; and wherein at least one of the first folding axis and the second folding axis is normal to the same plane.

3. The mobile device of claim 2, wherein the edge of the first part, the edge of the second part, and the edge of the third part lie in the same plane.

4. The mobile device of claim 1, wherein the first portion further comprises a hinge that foldably couples the first part to the second part.

5. The mobile device of claim 1, wherein the one or more coupling elements comprises a hinge that foldably couples the second part of the first portion to the third part of the second portion.

6. The mobile device of claim 1, wherein the second part provides a contact surface configured to abut the third part and to stop the second part from folding about the second folding axis with respect to the third part, after a predetermined fold angle between the second part and the third part is obtained.

7. The mobile device of claim 6, wherein the second part provides a beveled edge; and wherein the beveled edge comprises the contact surface.

8. The mobile device of claim 1, wherein the second part provides a contact surface configured to mate with an indent in the second portion and to stop the second part from folding about the second folding axis with respect to the third part, after a predetermined fold angle between the second part and the third part is obtained.

9. The mobile device of claim 1, wherein the first portion is configured to slide relative to the second portion between at least a first position and a second position; wherein in the first position, the third display screen is covered by the first portion; and wherein in the second position, the third display screen is at least partially exposed by the first portion.

10. The mobile device of claim 9:
wherein each of the first part, the second part, and the third part comprises a respective front surface;
wherein the first display screen is on the front surface of the first part, the second display screen is on the front surface of the second part, and the third display screen is on the front surface of the third part;
wherein the first part is configured to fold with respect to the second part about the first folding axis such that the front surface of the first part moves towards the front surface of the second part; and
wherein the second part is configured to fold with respect to the third part about a second folding axis in the second position such that the front surface of the second part moves towards the front surface of the third part.

11. The mobile device of claim 10, wherein in the second position, the respective front surfaces of the first, second and third parts form a concave "U"-like shape, with the respective front surfaces of the first, second and third parts on the interior of the concave "U"-like shape.

12. The mobile device of claim 1, wherein the first portion is configured to slide with respect to the second portion in a slide direction; and wherein the slide direction is perpendicular to at least one of the first folding axis and the second folding axis.

13. The mobile device of claim 1, wherein the second portion further comprises a fourth part; and wherein the fourth part provides at least a fourth display screen.

14. The mobile device of claim 13, wherein the first portion is configured to slide relative to the second portion between at least a first position and a second position; wherein in the first position, the third and fourth display screens are covered by the first portion; and wherein in the second position, at least one of the third and fourth display screens is at least partially exposed by the first portion.

15. The mobile device of claim 13, wherein the third part of the second portion is foldably coupled to the fourth part of the second portion to allow the third part to fold with respect to the fourth part about a third folding axis.

16. The mobile device of claim 15, wherein the second portion further comprises a hinge that foldably couples the third part to the fourth part.

17. The mobile device of claim 14:
wherein each of the first part, the second part, the third part and the fourth part comprises a respective front surface;
wherein the first display screen is on the front surface of the first part, the second display screen is on the front surface of the second part, the third display screen is on the front surface of the third part, and the fourth display screen is on the front surface of the fourth part;
wherein the first part is configured to fold with respect to the second part about the first folding axis such that the front surface of the first part moves towards the front surface of the second part;
wherein in the second position, the second part is configured to fold with respect to the fourth part about a second folding axis; and
wherein the third part is configured to fold with respect to the fourth part about the third folding axis such that the front surface of the third part moves towards the front surface of the fourth part.

18. The mobile device of claim 17, wherein the second part is configured to fold with respect to the fourth part about the second folding axis in the second position such that the front surface of the second part moves away from the front surface of the fourth part, and such that the respective front surfaces of the first, second, third, and fourth parts form a "W"-like shape, with the respective front surfaces of the first, second, third and fourth parts on the interior of the "W"-like shape.

19. The mobile device of claim 1, wherein the third display screen provides a display area that is larger than a display area of each of the first display screen and the second display screen.

20. The mobile device of claim 1, wherein at least one of the first, second and third display screens comprises a touch screen.

21. The mobile device of claim 9, wherein at least one of the first, second and third display screens comprises a touch screen; and wherein at least one of the first, second and third display screens is configured to accept touch screen input when the first portion is in one of the first and second positions, but to not accept touch screen input when the first portion is in one other of the first and second positions.

22. The mobile device of claim 1, wherein each of the first portion and the second portion comprises a respective front surface; and wherein the front surface of the first portion and the front surface of the second portion are substantially equal in area.

* * * * *